(12) United States Patent
Ginzboorg

(10) Patent No.: US 8,571,519 B2
(45) Date of Patent: Oct. 29, 2013

(54) METHOD AND APPARATUS FOR USING PSEUDONYMS

(75) Inventor: Philip Ginzboorg, Espoo (FI)

(73) Assignee: Nokia Corporation, Espoo (FI)

( * ) Notice: Subject to any disclaimer, the term of this patent is extended or adjusted under 35 U.S.C. 154(b) by 628 days.

(21) Appl. No.: 12/437,432

(22) Filed: May 7, 2009

(65) Prior Publication Data

US 2010/0285774 A1 Nov. 11, 2010

(51) Int. Cl.
*H04M 3/16* (2006.01)
(52) U.S. Cl.
USPC .......................................................... 455/411
(58) Field of Classification Search
USPC ......... 370/515, 107, 329, 221, 252, 328, 229, 370/210, 238; 455/411, 456.3, 456.2, 455/456.1, 418, 458, 414.1; 340/2.1; 705/1; 713/168; 714/703
See application file for complete search history.

(56) References Cited

U.S. PATENT DOCUMENTS

| | | | | | |
|---|---|---|---|---|---|
| 2001/0052075 | A1* | 12/2001 | Feinberg | ........................ | 713/168 |
| 2003/0200489 | A1* | 10/2003 | Hars | ............................ | 714/703 |
| 2004/0088540 | A1 | 5/2004 | Marturano et al. | | |
| 2008/0126113 | A1* | 5/2008 | Manning et al. | ................... | 705/1 |
| 2009/0072944 | A1* | 3/2009 | Hayward | ....................... | 340/2.1 |

FOREIGN PATENT DOCUMENTS

EP 1 587 239 A1 10/2005

OTHER PUBLICATIONS

Anonymous Secure Communication in Wireless Mobile Ad-hoc Networks, 2007, Rahman et al., pp. 1-10.
International search report and written opinion for corresponding international application No. PCT/IB2010/001046 dated Sep. 30, 2010, pp. 1-10.
Mask: Anonymous On-Demand Routing in Mobile Ad Hoc Networks, Zhang et al., IEEE Transactions on Wireless Communications, vol. 5, No. 9, Sep. 2006, pp. 2376-2385.
"$3^{rd}$ Generation Partnershp Project; Technical Specification Group Services and System Aspects; Generic Authentication Artchitecture (GAA); Generic bootstrapping architecture (Release 6)", 3GPP TS 33.220 V6.13.0, Jun. 2007, 42 pgs.
Advanced Encryption Standard (AES), Federal Information Processing Standards Publication 197, Nov. 26, 2001, 47 pgs.
Banz, Robert, "Inter-Domain Data Exchange", Oct. 2002, 22 pgs.
Knuth, Donald Ervin, "The Art of Computer Programming, , Sorting and Searching," vol. 3, Chapter 6.3, Addison-Wesley, $2^{nd}$ edition, 1998, p. 492.
Bellare, M., et al., "The EAX Mode of Operation (A Two-Pass Authenticated-Encryption Scheme Optimized for Simplicity and Efficiency)", Jan. 28, 2004, 44 pgs.
Perlman, Radia, "Longest Prefix Match with Trie", Interconnections, Bridges, Router, Switches, and Internetworking Protocols, Chapter 13.3, Addison Wesley, 2000, pp. 350-361.

(Continued)

*Primary Examiner* — Kiet Doan
(74) *Attorney, Agent, or Firm* — Harrington & Smith

(57) ABSTRACT

An approach is provided for using pseudonyms to protect privacy and anonymity of communication messages. A pseudonym is extracted from a received message for comparison against a precomputed set of pseudonyms associated respectively with a plurality of communities of wireless nodes. The pseudonyms are valid only for a particular time period.

20 Claims, 25 Drawing Sheets

(56) References Cited

OTHER PUBLICATIONS

Reiter, Michael K., et al.. "Crowds: Anonymity for Web Transactions", ACM Trans. Inf. Syst. Secur. 1(1), 1998, pp. 1-23.

Stinson, Douglas R., "Cryptography: Theory and Practice", Chapter 4.2.2., Chapman & Hall /CRC $2^{nd}$ edition, 2002, pp. 123-124.

Ginzboorg, Philip, "Policy-based route selection in a telephone exchange", Master's Thesis, Helsinki University of Technology, 2001, 57 pgs.

Gonnet, G.R., et al., "Handbook of algorithms and data structures: in Pascal and C,", Chapter 3.4.4, Addison-Wesley, 2 edition, 1991, pp. 133-143.

Sedgewick, Robert, "Algorithms in C", Chapter 15.4, Addison-Wesley, 2002, pp. 635-636.

Chaum, David L., "Untraceable Electronic Mail, Return Addresses, and Digital Pseudonyms", ACM, 24(2), 1981, pp. 84-88.

Goldschlag, David, et al., "Onion Routing for Anonymous and Private Internet Connections", Communication Of the ACM, vol. 42, No. 2, Feb. 1999, pp. 39-41.

\* cited by examiner

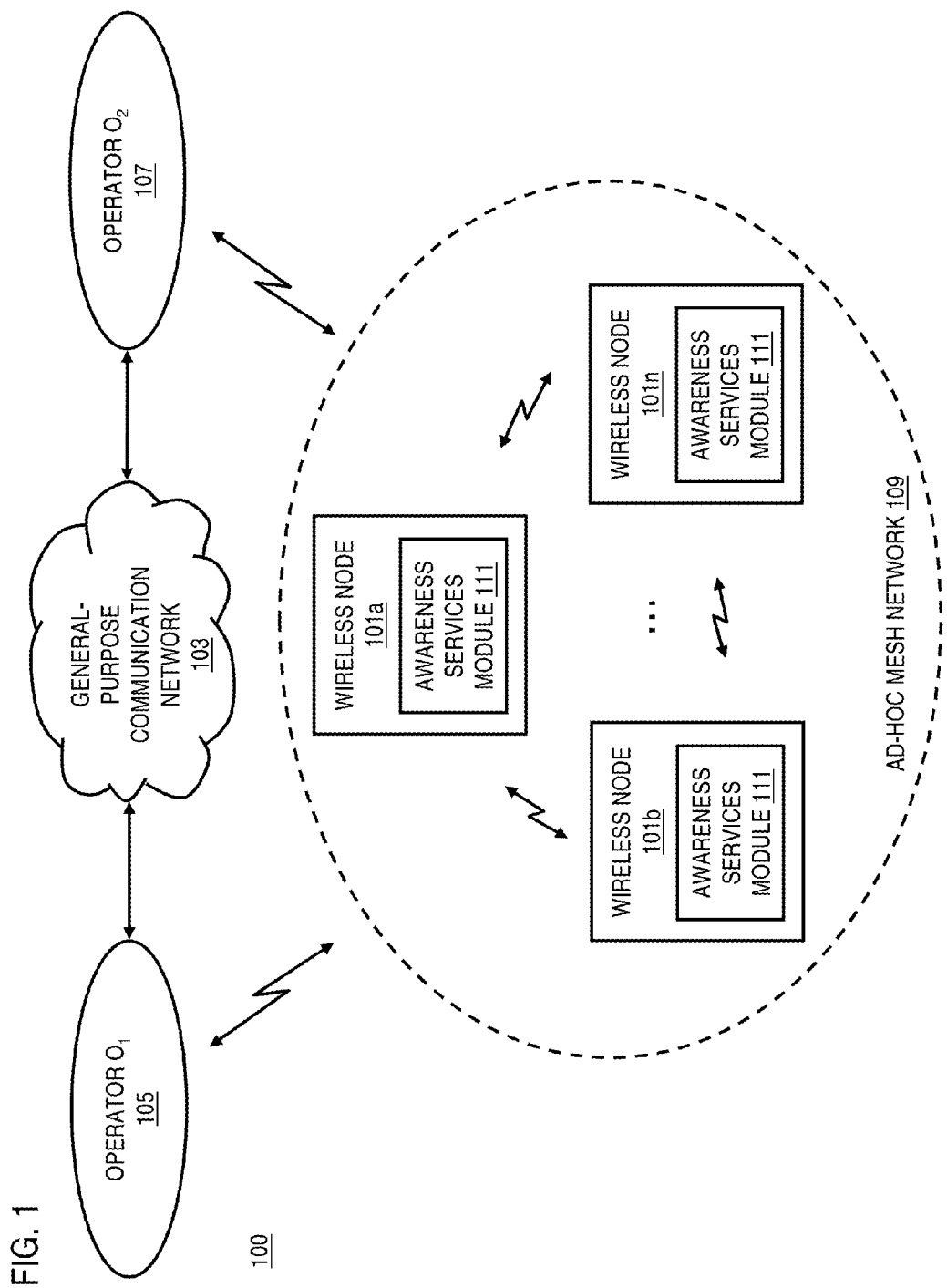

FIG. 2F

NETWORK LAYER MESSAGE HEADER 281

| TX 282 (TRANSMITTER NID) | SRC 293 (SOURCE NID) | DST 294 (DESTINATION NID) | MSN 295 (MESSAGE SEQUENCE NUMBER) | HOP COUNT 296 | GEOGRAPHICAL LIMIT 297 | TEMPORAL LIMIT 298 | CONTEXT LIMIT 299 |

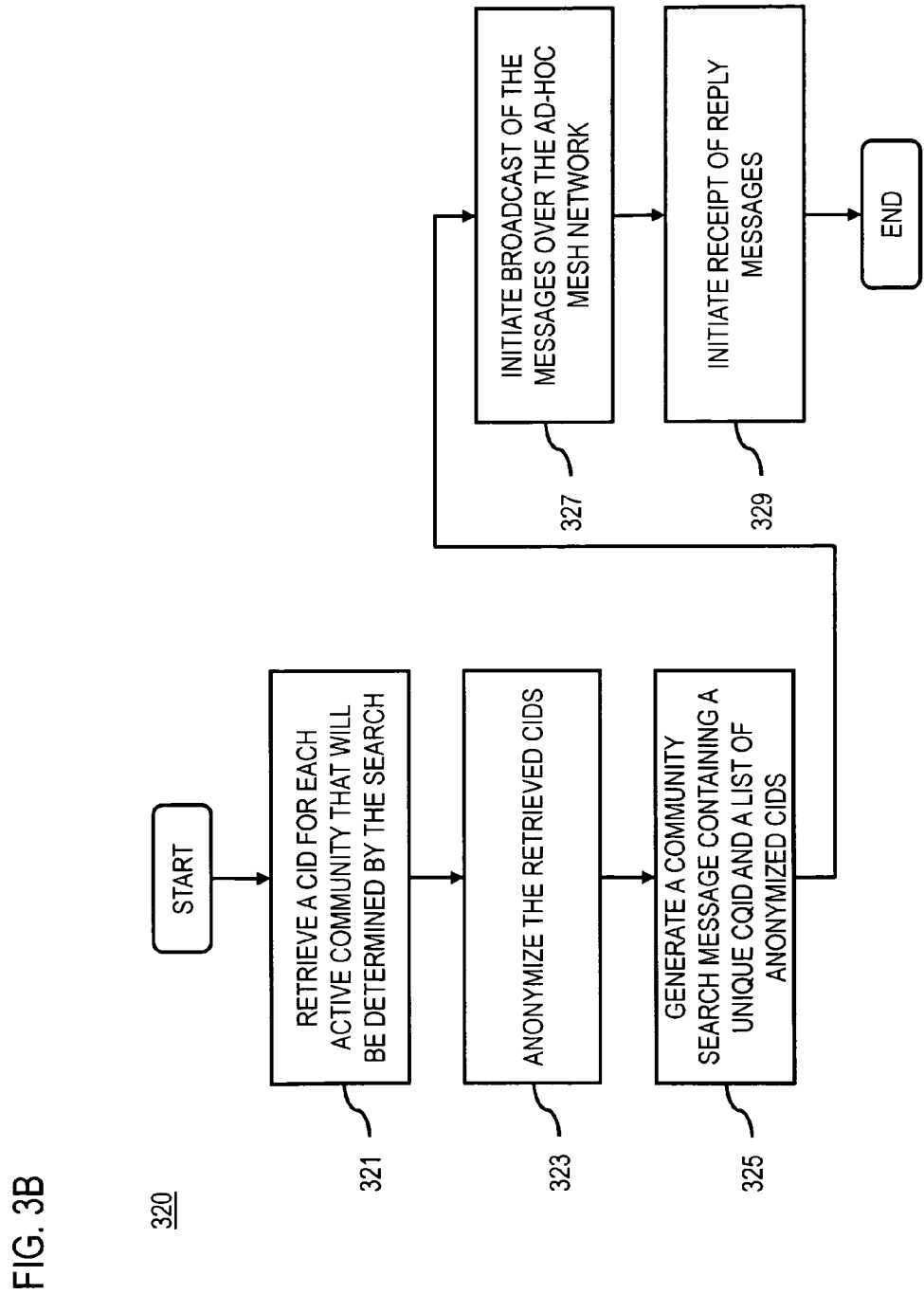

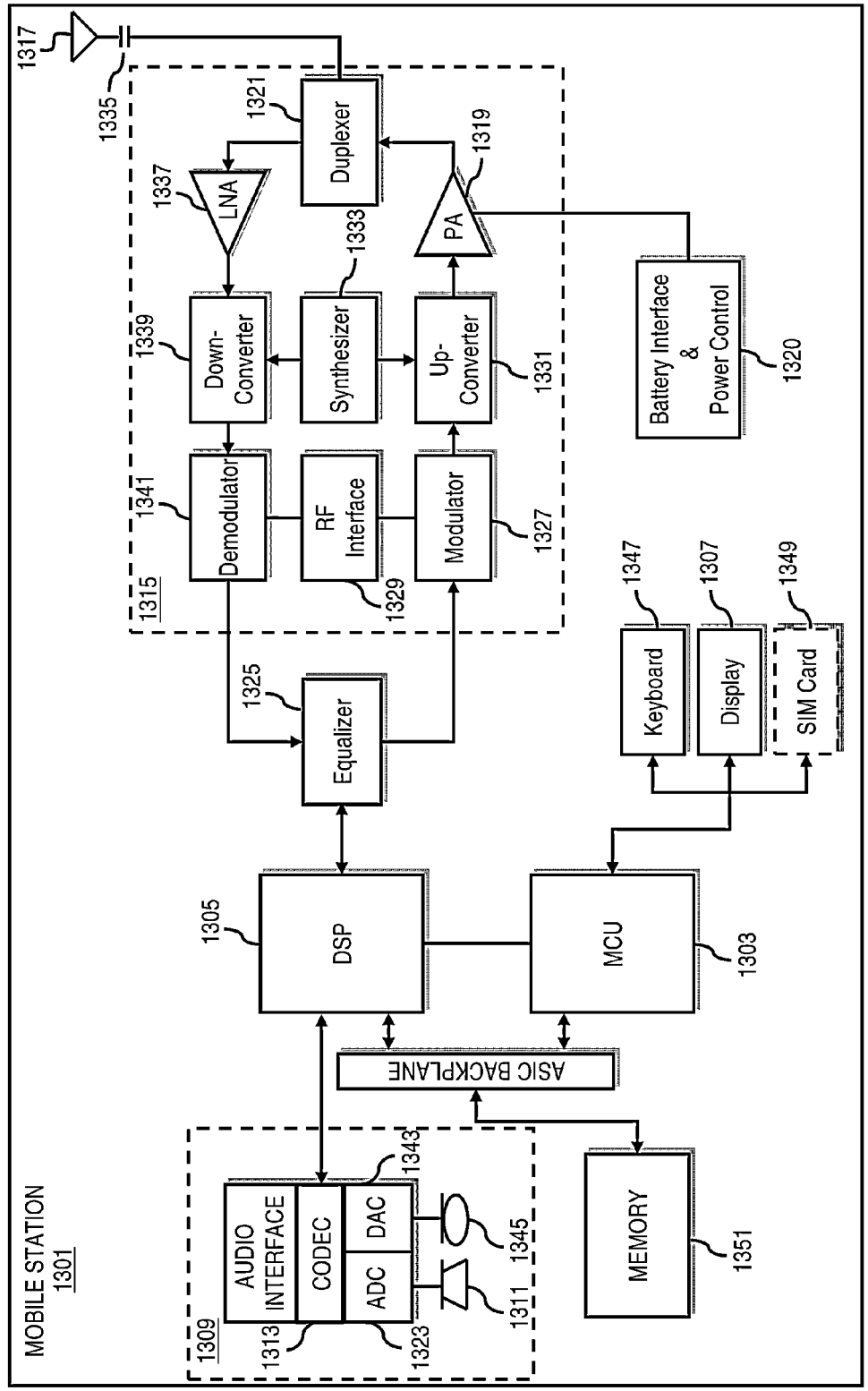

METHOD AND APPARATUS FOR USING PSEUDONYMS

FIELD OF INVENTION

The exemplary and non-limiting embodiments of this invention relate generally to wireless communication systems, methods, devices and computer programs and, more specifically, relate to using anonymized identifiers in messages between members of a private community.

BACKGROUND

Wireless (e.g., cellular) service providers and device manufacturers are continually challenged to deliver value and convenience to consumers by, for example, providing compelling network services, applications, and content. One area of development is the use of communication networks and devices to automatically determine information and context about the local environment. However, technical challenges relating to power consumption, signaling overhead, security, and privacy have hindered such development.

SOME EXEMPLARY EMBODIMENTS

Therefore, there is a need for an approach for using pseudonyms to protect privacy and anonymity over a communication network.

According to one embodiment, a method comprises receiving a message corresponding to one of a plurality of communities of wireless nodes. The method also comprises extracting a pseudonym from the message. The method further comprises comparing the extracted pseudonym with a precomputed set of pseudonyms associated respectively with the communities. The method further comprises determining a particular one of the communities based on the comparison. The precomputed set of pseudonyms is valid for a particular time period.

According to another embodiment, an apparatus comprising at least one processor, and at least one memory including computer program code, the at least one memory and the computer program code configured to, with the at least one processor, cause the apparatus to receive a message corresponding to one of a plurality of communities of wireless nodes. The apparatus is also caused to extract a pseudonym from the message. The apparatus is further caused to compare the extracted pseudonym with a precomputed set of pseudonyms associated respectively with the communities. The apparatus is further caused to determine a particular one of the communities based on the comparison. The precomputed set of pseudonyms is valid for a particular time period.

According to one embodiment, a computer-readable storage medium carrying one or more sequences of one or more instructions which, when executed by one or more processors, cause an apparatus to receive a message corresponding to one of a plurality of communities of wireless nodes. The apparatus is also caused to extract a pseudonym from the message. The apparatus is further caused to compare the extracted pseudonym with a precomputed set of pseudonyms associated respectively with the communities. The apparatus is further caused to determine a particular one of the communities based on the comparison. The precomputed set of pseudonyms is valid for a particular time period.

According to one embodiment, an apparatus comprises means for receiving a message corresponding to one of a plurality of communities of wireless nodes. The apparatus also comprises means for extracting a pseudonym from the message. The apparatus further comprises means for comparing the extracted pseudonym with a precomputed set of pseudonyms associated respectively with the communities. The apparatus further comprises means for determining a particular one of the communities based on the comparison. The precomputed set of pseudonyms is valid for a particular time period.

According to another embodiment, a method comprises selecting a pseudonym from a precomputed set of pseudonyms. The method also comprises generating a message comprising the pseudonym or an index pointing to the pseudonym corresponding to one of a plurality of communities of wireless nodes. The method further comprises initiating transmission of the message to a plurality of wireless nodes. The precomputed set of pseudonyms is valid for a particular time period.

According to another embodiment, an apparatus comprising at least one processor, and at least one memory including computer program code, the at least one memory and the computer program code configured to, with the at least one processor, cause the apparatus to select a pseudonym from a precomputed set of pseudonyms. The apparatus is also caused to generate a message including the pseudonym or an index pointing to the pseudonym corresponding to one of a plurality of communities of wireless nodes. The apparatus is further caused to initiate transmission of the message to a plurality of wireless nodes. The precomputed set of pseudonyms is valid for a particular time period.

According to another embodiment, a computer-readable storage medium carrying one or more sequences of one or more instructions which, when executed by one or more processors, cause an apparatus to select a pseudonym from a precomputed set of pseudonyms. The apparatus is also caused to generate a message including the pseudonym or an index pointing to the pseudonym corresponding to one of a plurality of communities of wireless nodes. The apparatus is further caused to initiate transmission of the message to a plurality of wireless nodes. The precomputed set of pseudonyms is valid for a particular time period.

According to yet another embodiment, an apparatus comprises means for selecting a pseudonym from a precomputed set of pseudonyms. The apparatus also comprises means for generating a message including the pseudonym or an index pointing to the pseudonym corresponding to one of a plurality of communities of wireless nodes. The apparatus also comprises means for initiating transmission of the message to a plurality of wireless nodes. The precomputed set of pseudonyms is valid for a particular time period.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a communication system capable of using a pseudonym, according to an exemplary embodiment;

FIG. 2F is a diagram of the data structure of a network layer message header;

FIG. 3B is a flowchart illustrating a process for determining whether there are wireless nodes that are members of one or more specific active communities, according to an exemplary embodiment of the present invention.

FIG. 5A is a ladder diagram that illustrates a sequence of messages and processes used in a replying node, according to an exemplary embodiment;

FIG. 13 is a diagram of a mobile station (e.g., handset) that can be used to implement an embodiment of the invention.

DESCRIPTION OF PREFERRED EMBODIMENT

Figure 2A:
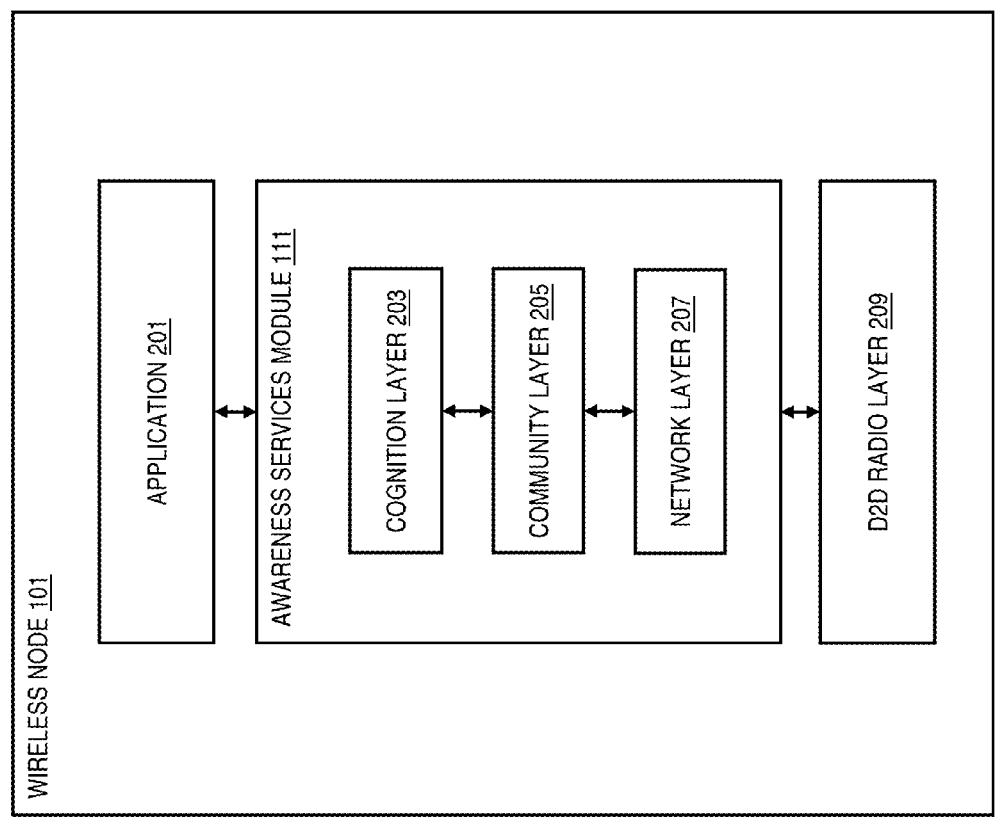
FIG. 2A is a diagram of the components of a wireless node including an awareness services module, according to an exemplary embodiment.

A method and apparatus for using pseudonyms are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "awareness information" refers to any information and/or context about a local environment as well as the users and communication devices within the local environment. By way of example, awareness information can be used to support applications for creating social networks, determining presence, determining contexts associated with a device, advertising, searching for information, etc. Although various exemplary embodiments are described with respect to using pseudonyms to ensure the privacy of users belonging to communities within an ad-hoc mesh network, it is contemplated that the approach described herein may be used within any type of communication system or network.

FIG. 1 is a diagram of a communication system capable of using a pseudonym, according to an exemplary embodiment. Information and context comprise "awareness information" that metaphorically equip a communication device with "radio eyes and ears" to continuously collect and exchange information with other devices in a local environment. However, development of a system for providing awareness information poses significant technical challenges, particularly in the areas of creating a network for sharing awareness information, locating and organizing awareness information, forming communities for sharing awareness information, managing power consumption for devices constantly engaged in sharing awareness information, developing applications to take advantage of the awareness information, maintaining the privacy and anonymity of users sharing awareness information, and preventing the proliferation of undesired messages (e.g., spam) over the network. The approach described herein uses pseudonyms to maintain privacy and anonymity by, for instance, anonymizing information shared among members of one or more communities within an ad-hoc mesh network.

As shown in FIG. 1, a system 100 comprises one or more wireless nodes 101a-101n having connectivity to a communication network 103 through either operator A 105 or operator B 107. The wireless nodes 101a-101n are any type of mobile terminal, portable terminal, or fixed terminal including mobile handsets, personal computers, stations, units, devices, multimedia tablets, Internet nodes, communicators, Personal Digital Assistants (PDAs), radio readable tags (e.g., near field communication (NFC) tags, radio frequency identification (RFID) tags), or any combination thereof. It is also contemplated that the wireless nodes 101a-101n can support any type of interface to the user (such as "wearable" circuitry, etc.).

In exemplary embodiments, the wireless nodes 101a-101n form an ad-hoc mesh network 109 for sharing awareness information. The ad-hoc mesh network 109 is, for instance, a connectionless and serverless device-to-device network (e.g., a mobile ad-hoc network (MANET)) created using short-range radio technology (e.g., wireless local area network (WLAN) or Bluetooth®). Within the ad-hoc mesh network 109, each wireless node 101 may be mobile and is within communication range of any number of other wireless nodes 101. Accordingly, the set of wireless nodes 101a-101n that is within communication range of any a particular wireless node 101 is transient and can change as the wireless nodes 101a-101n move from location to location.

As discussed previously, service providers and device manufacturers that are developing communication systems and networks for locating communities face many technical challenges. For example, current ad-hoc radios (e.g., WLAN and Bluetooth®) are designed for connectivity (e.g., connectivity via Internet protocol (IP)). However, in an "always on" environment such as the ad-hoc mesh network 109, it is not practical to have a large number of wireless nodes 101a-101n (e.g., mobile handset devices) "connected" by, for instance, IP to each other for extended periods of time because of power usage and scalability problems. Specifically, a multi-hop connection in a large ad-hoc network typically requires a significant amount of control signaling and power and can quickly deplete a mobile device's battery. Moreover, scalability can be a problem because current ad-hoc radios are typically limited in the number of connections and the related signaling that they can support at any given time. Another shortcoming of current ad-hoc radios is that they do not adequately protect a user's privacy because they expose the user's identity through a fixed network address (e.g., a media access control (MAC) address) associated with the user's device.

To address these problems, the system 100 creates the ad-hoc mesh network 109 for sharing awareness information in a connectionless fashion. As used herein, the term "connectionless" refers to the ability of a node (e.g. wireless node 101a) to send and of all surrounding nodes 101a-101n to receive awareness information without the need to send any prior control signaling. For example, sending awareness information using the transmission control protocol/IP (TCP/IP) over a WLAN ad-hoc is not connectionless because of the two-way TCP control signaling between the sending and receiving nodes used to establish the TCP connection. The awareness information is provided, for instance, in small anonymous messages that are exchanged by the wireless nodes 101a-101n automatically without user intervention. As used herein, the term "anonymous" means that it is not possible to infer the true identity of the sender from the message, unless the true identity is intentionally included in the message (e.g., by the user or another entity authorized by the user). The exchange of awareness information occurs as a broadcast message (i.e., a flooding message) from a wireless node 101 to neighboring wireless nodes 101 that are within range of the radio of the broadcasting wireless node 101. As neighboring wireless nodes 101 receive the broadcasted message, each receiving wireless node 101 may in turn rebroadcast the message to other neighboring wireless nodes 101. In this way, the originally broadcasted message propagates throughout the ad-hoc mesh network 109. In exemplary embodiments, the extent of the propagation may be limited by criteria such as distance, location, time, etc.

Unlike traditional systems, such messages are only for carrying awareness information and are not for transporting content (e.g., files or media containing voice, video, etc) between two wireless nodes (e.g., wireless nodes 101a and 101b). Instead, the messages contain only pointers to the content or a small amount of data (e.g. presence or context information) to minimize the data traffic transported over the ad-hoc mesh network 109. The wireless nodes 101a-101n may then access the content using other communication channels (e.g., via IP through the communication network 103). In addition, the system 100 eliminates the problems associated with traditional methods for route establishment and maintenance (e.g., connection based communication protocols), such as maintaining and handing off connections as mobile devices move, and requiring high levels of network resources for maintaining connections in an environment with a high number or density of mobile devices. For example, the system 100 creates routing information only when needed to route replies to queries back to the querying node. The routing information is generated by using the query messages alone (i.e. no control signaling is used for creating routing information). After the query and subsequent reply process is completed, the routes are forgotten. In other words, the query/reply process of system 100 provisions routes for a reply to provide awareness information on demand rather than pushing awareness information from one node 101 to another. In exemplary embodiments, both push (e.g., information is published over the ad-hoc mesh network 109) and pull (e.g., information is queried from other nodes 101a-101n of the ad-hoc mesh network 109) modes of disseminating awareness information are possible. In certain embodiments, it is contemplated that the pull mode of operation can be used instead of the push mode to help suppress potential spam messages.

Moreover, the system 100 optimizes the power consumption of wireless nodes 101 communicating over the ad-hoc mesh network 109 to enable always-on operation without seriously affecting the battery life of the wireless nodes 101. For instance, by utilizing only short awareness messages, by eliminating the need for any route maintenance signaling, by employing procedures to minimize transmission and reception of duplicative messages and by enabling an efficient sleep scheme for the short-range device-to-device radio used within each wireless node 101 (allowed by the low latency requirements typical of an awareness information network), the system 100 can potentially provide hundreds of hours (e.g., over 400 hours) of continuous operation of each wireless node 101 between battery charges in a mobile device.

The system 100 also enables the development of new services and applications based on awareness information (e.g., social networking applications, location-based applications, application for determining presence, applications for determining context, advertising applications). In particular, the continuous and immediate nature of the awareness information with respect to local environment enables compelling new services. For instance, awareness information may be combined with the increasingly available storage and computing power in mobile devices (e.g., wireless nodes 101a-101n) to create a local semantic web, whereby local awareness information is created and searched for automatically by wireless nodes 101 within the ad-hoc mesh network 109. As used herein, the term "semantic web" refers to a system in which the information and messages shared with the system is understandable by the nodes 101 within the system. It is noted that establishing such a local semantic web using the system 100 overcomes two major problems blocking the development of a global semantic web: (1) lack of mechanism for providing semantic content on a large scale, and (2) lack of semantically aware search engines to help users find information in a semantic web. The system 100 can also be used for collaborative context calculation, publishing pointers to information or content, search for friends within a defined community, finding out what is going on and what kind of people are around a user, making the environment aware of the user, and other like applications.

In a first use-case, the awareness information alerts a user to nearby people or places. For example, a user is visiting a new town when the wireless node 101a alerts the user that "Salvatore, a friend of your friend David is nearby." The user may then arrange to meet Salvatore to get a recommendation for sites to visit in the new town. In another example, a user is looking for a good restaurant in an unfamiliar neighborhood. An application based on awareness information may present a list of local restaurants ranked by the number of people currently eating in the restaurant that have the same food preferences as the user. Such a list can be collected based on queries and replies that contain anonymous information of people's food preferences.

In a second use-case, an application uses the awareness information to discover events near the user. For example, as a user passes a park, the wireless node 101a informs the user, based on messages exchanged between nearby devices, that "There is a Japanese culture festival in the Tea Garden Park; five members of your Kabuki community are there: Zen, Mi, Xia, Talo, and Chris." The user may then decide to attend the festival.

In a third use-case, an application provides location-based or context-based services using awareness information. For example, a wireless node 101a does not have positioning capabilities but nonetheless knows that it is in a grocery store based on anonymous awareness information from other nearby wireless nodes 101. The wireless node 101a then reminds the user to "Remember to buy dishwasher detergent" based on the user's location in a grocery store. The awareness information can also be the physical position information from a neighboring wireless node 101 that has the positioning capability. Sharing of positioning information with a neighboring node with such a capability can enable nodes 101 without such capability to offer navigational services.

In another example, a group of people are attending a meeting. The meeting invitation includes an identification code for that particular meeting that is stored in the mobile nodes 101 of the meeting attendees (e.g., the identification code may be stored in the calendar data). Using the principles set forth in this invention, the nodes 101 can exchange the meeting identification code over the ad-hoc mesh network 109 while attending the meeting. Comparing the exchanged identification code in a user's wireless device 101 can, for instance, establish whether the users was indeed at the meeting corresponding to the identification code. Such accurate social context knowledge can be used, for instance, to adapt the service or application behavior towards the user.

In a fourth use-case, an application provides for search of local information that changes rapidly and very specific to a local environment. The local information often does not reach traditional Internet search engines. For example, a user bought tickets to a concert, but discovers at the last minute that the user cannot attend. The user stores a string "Ticket to concert X at venue Y is available" into the awareness services module 111 of the user's wireless node 101. As a result, a nearby wireless node 101a, within a few street blocks away, that searches for tickets by sending query messages with a string "Ticket concert X" over the multi-hop ad-hoc mesh network 109, will receive the user's ticket availability message as an automatic reply.

In a fifth use-case, an application enables locally targeted advertising. For example, it is almost closing time for a local fresh fruit market. The merchants decide to publish an advertisement over the ad-hoc mesh network 109 that "Apples are 50% off for the rest of the day." The advertisement is available to users who live nearby the market. In another example, a user browses an advertisement for a new printer on a wireless node 101a. In the browsing activity, a code attached to the advertisement is stored in the awareness services module 111. Upon searching and finding such a code, a nearby electronics store sends the user an offer to sell the printer with a 10% discount.

In a sixth use-case, an application automatically creates an activity log based on the awareness information associated with a user. For example, the application records the people the user meets along with other awareness information such as when, where, context, etc. The user then meets a person while walking on the street. The person looks familiar but the user does not recall the person's name or how the user knows the person. The wireless node 101a running the application reports that the person's name is David and that the user met him at a soccer match one year ago in London.

In a seventh use-case, an application provides the capability to initiate local discussion threads and group chats over the ad-hoc mesh network 109. For example, the supporters of a football team form a community over the ad-hoc mesh network 109 wherein community members can send short text messages (e.g., of small enough size to be sent directly over the ad-hoc mesh network 109) that can be received and read only by the fan club community members of that particular team.

FIG. 2A is a diagram of the components of a wireless node including an awareness services module, according to an exemplary embodiment. FIG. 2A is described with respect to FIGS. 2B-2E which are diagrams of the components of an awareness services module, according to various exemplary embodiments. As shown in FIG. 2A, a wireless node 101 includes one or more components for sharing awareness information within the ad-hoc mesh network 109. It is contemplated that the functions of these components may be combined in one or more components or performed by other components of equivalent functionality. In this embodiment, the wireless node 101 includes an application 201 that uses awareness information to provide various services and functions including social networking, location-based services, presence information, context determination, advertising functions, etc. The application 201 may interact with the awareness services module 111 to obtain or share awareness information.

Figure 2B:
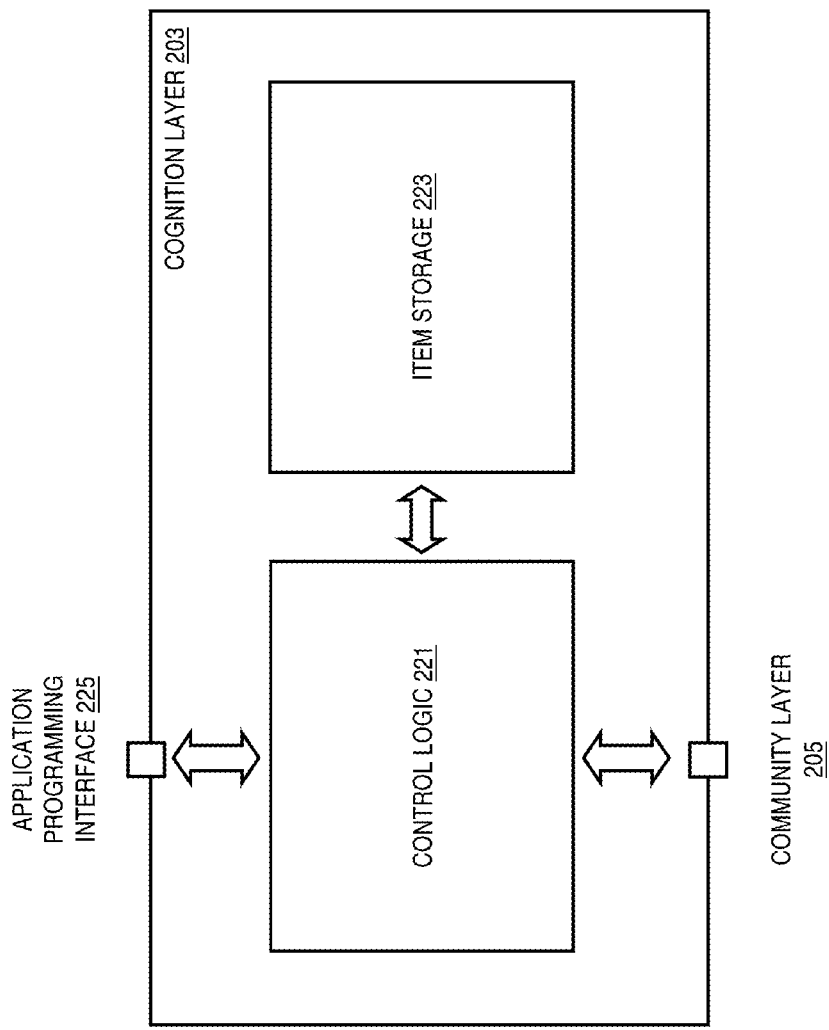
FIGS. 2B-2E are diagrams of the components of an awareness services module, according to various exemplary embodiments.

By way of example, the awareness service module 111 includes three layers: a cognition layer 203, a community layer 205, and a network layer 207. The cognition layer 203 is the highest control layer for sharing awareness information. As shown in FIG. 2B, the cognition layer 203 includes a control logic 221 and item storage 223. The control logic 221, for instance, provides the logic for creating, publishing, querying, and receiving awareness information over the ad-hoc mesh network 109. The control logic 221 can store the information that it either creates or receives in the item storage 223. It is contemplated that the item storage 223 may be of sufficient size to store all or a portion of the information that flows through the wireless node 101 over a configurable period of time (e.g., days, months, or years).

In exemplary embodiments, the control logic 221 enables querying and dissemination of awareness information by initiating the flooding of the query or information to neighboring wireless nodes 101 within the ad-hoc mesh network 109. For example, upon receiving a query, the wireless nodes 101 in the local neighborhood that have the queried information reply to the querying node automatically. In exemplary embodiments, the reply information is also automatically stored in the item storage 223 of each wireless node 101 through which the propagating reply passes. Moreover, the reply to a query may result in return of a pointer to specific content relevant to the query rather than the content itself under certain circumstances (e.g., when the specific content is large in size). It is contemplated that the reply may contain direct content if the content is relatively small (e.g., a few bytes of information). By using a pointer, the system 100 minimizes the data traffic that flows through the ad-hoc mesh network 109. The user may then access the content via the pointer (e.g., a universal resource locator (URL) address, IP address) via a more appropriate communication protocol (e.g., IP) and/or means of communication (e.g. infrastructure networks). The receipt of the pointer (e.g., IP address) may automatically trigger the transfer of the content using, for instance, the communication protocol associated with the pointer. In the case of broadcasting or publishing information, any wireless node 101 through which the published information propagates may store the information in item storage 223 of the wireless node 101.

In other exemplary embodiments, awareness information can also be published directly by flooding an awareness message. Such a push mode for the dissemination of awareness information can be used to support some applications (e.g. advertising or group chatting) over the ad-hoc mesh network 109.

It is recognized that privacy and anonymity may be of concern to users of the system 100. Accordingly, the control logic 221 provides mechanisms for ensuring privacy and anonymity. For example, the control logic 221 can prevent the transmission of intimate information when the number of neighboring wireless nodes is small to prevent the possibility of inferring identity. As used herein, the term "intimate information" refers to information directly related to the user, e.g., the user's habits, tastes, or preferences (musical preferences, favorite restaurants, etc.).

The control logic 221 may also periodically broadcast decoy queries and replies to make tracking an individual wireless node 101 more difficult. Since an outside observer does not know the authentication key associated with a community, the observer cannot distinguish a valid message from a fictitious one. Accordingly, by observing decoy messages, the observer is likely to detect presence of a private community when there is not one. Additionally, the control logic 221 enables to user to define filters for incoming information (e.g., filter advertisements) and how these filters would work (e.g., ignore the information completely, relay the information but do not store, etc.). It is also contemplated that the user can direct the control logic 221 to control the user's visibility on the ad-hoc mesh network 109 (e.g., no visibility, visible only to a certain community or other user) to maintain privacy. As another mechanism for protecting privacy, the control logic 221 can interact with the community layer 205 to anonymize a specific message and corresponding identifiers as described below with respect to the community layer 205.

Because one of the goals of the system 100 is to provide a mechanism for anonymous spreading of awareness information, it is recognized that undesired or unsolicited messages (e.g., spam messages) may become a problem. To address this problem, the control logic 221 may obtain, for instance, information from the lower system layers of the awareness services module 111 about the traffic load and current average power consumption. If the traffic load is medium or high (meaning that also power consumption related to system 100 is medium or high) restrictions may be set for the frequency at which flooding messages are sent by the control logic 221. It is also contemplated, that the neighboring peer nodes 101 can be configured to not forward any flooding messages originating from a node 101 neglecting such message restrictions.

The cognition layer 203, together with the community layer 205, provide an application programming interface (API) 225 to enable an application 201 to access the functions of the control logic 221 and the item storage 223. In exemplary embodiments, the API 225 enables application developers to have uniform and easy access to functions related to sharing awareness information over the ad-hoc mesh network 109. It is contemplated that the API 225 is extensible to accommodate any application designed to access or use awareness information. The applications in the various nodes 101 do not have to be the same or mutually compatible. It is sufficient that the applications use the API correctly to be able to publish and search awareness information in the surrounding nodes 101.

The cognition layer 203 also has connectivity to the community layer 205. The community layer 205 controls the formation and cataloging of communities of wireless nodes 101 within the ad-hoc mesh network 109. By way of example, a user may create any number of communities for sharing awareness information. It is contemplated that a community may be either a peer community (e.g., any wireless node 101 may join), a personal community (e.g., a wireless node 101 may join only if invited), or the open local community that consists of all nodes in the local neighborhood. In exemplary embodiments, the messages that traverse between the wireless nodes 101 within the ad-hoc mesh network 109 belong to one of these three community types. Communities can either be private (messages are encrypted) or public (no encryption used). In exemplary embodiments, membership and status in a community affect how the wireless node 101 shares awareness information (see the discussion with respect to FIG. 2G for additional details of community membership).

Figure 2C:
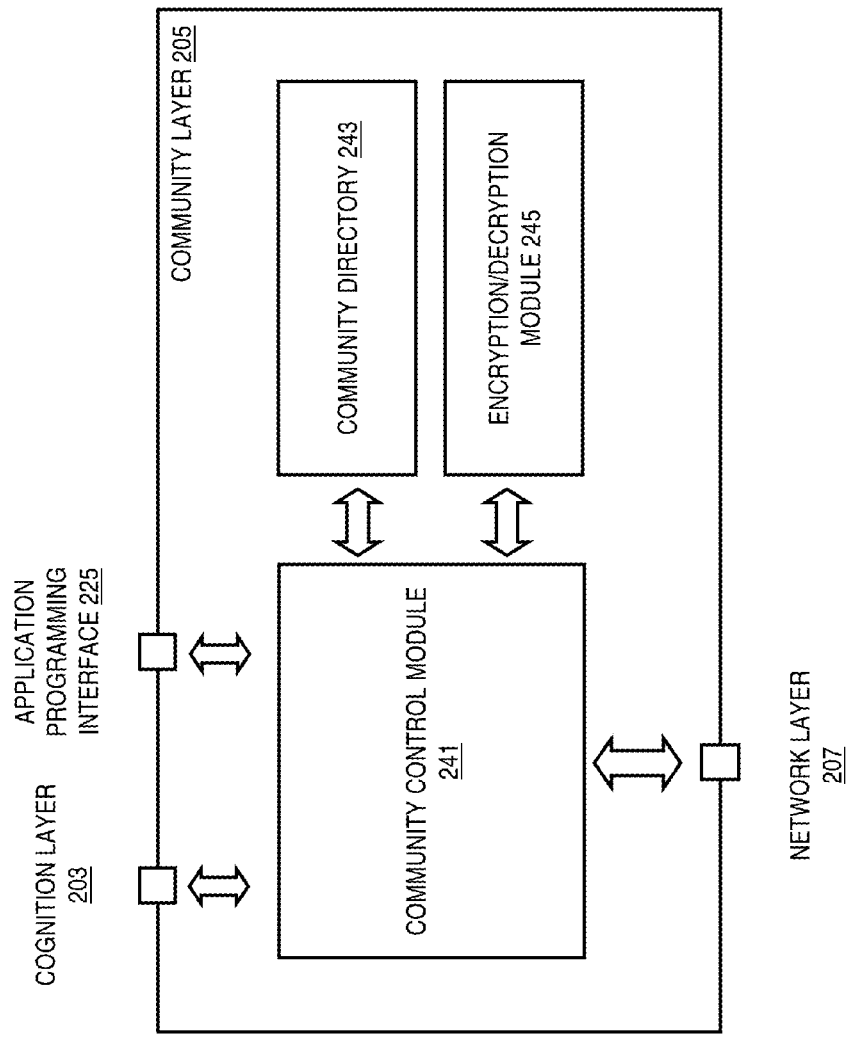

Furthermore, a community may be created for any purpose or duration (e.g., a permanent work community, a permanent community of friends, a temporary community of concert goers lasting only the duration of the concert). As shown in FIG. 2C, the community layer 205 includes a community control module 241, a community directory 243, and an encryption/decryption module 245. The community control module 241 provides the logic for creating, joining, managing (e.g., updating membership, configuring settings and preferences, setting privacy policies), and deleting communities. The module 241 also provides part of the API 225.

In exemplary embodiments, the community control module 241 assigns a unique community identification number (CID) to each community for use within the ad-hoc mesh network 109. The control module 241 can also generate authentication keys K associated with the CID to, for instance, authenticate users who wish to join the community or authenticate messages directed to the community. For example, a wireless node 101 may invite another wireless node 101 to join a community by transferring the CID and authentication keys associated with the community to the other wireless node 101. It is contemplated that the transfer of the CID and corresponding authentication key may occur using short range radio or using another secure mechanism (e.g., short message service (SMS) or electronic mail). It is noted that both peer and personal communities use a CID and corresponding K, whereas the open local community either can use a predetermined value for CID (e.g., zero) or does not use the CID at all.

To ensure privacy (as discussed above), the community control module 241 interacts an encryption/decryption module 245 to anonymize the CID when including the CID in messages over the ad hoc mesh network 109. For example, a wireless node 101 may direct a query to a specific community using an anonymized CID (e.g., a pseudonym) associated with the community in lieu of the actual CID. In exemplary embodiments, multiple anonymized CIDs may be used to represent a single community. In this way, it is more difficult to identify queries corresponding to a particular community by monitoring traffic within the ad hoc mesh network 109. From the perspective of an outside observer, the anonymized CIDs look random. In addition, the encryption/decryption module 245 may encrypt or decrypt message data using, for instance, a temporary key that is periodically derived from the authentication key K associated with the CID. These measures hinder the discovery of the CID by outsiders that do not have the authentication key.

Figure 10A:
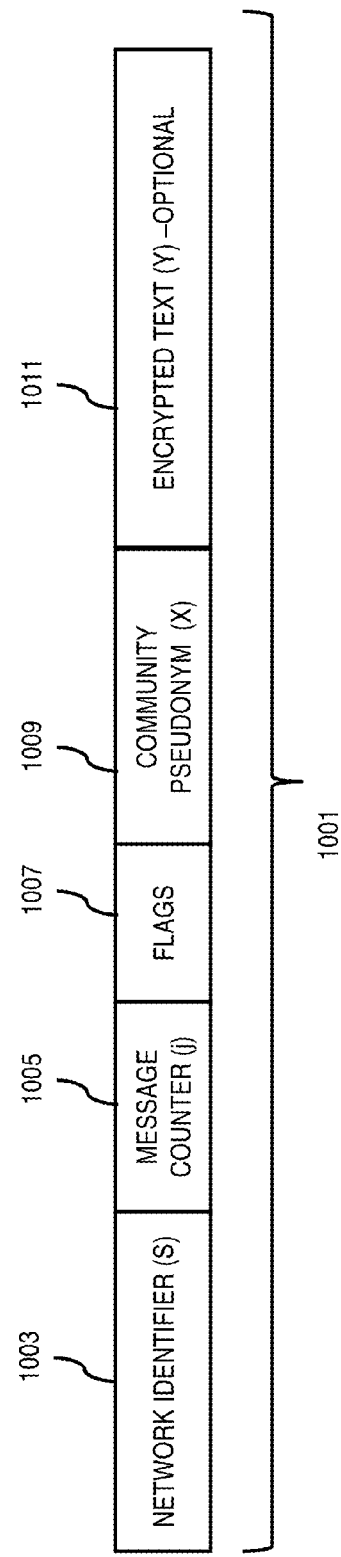
FIG. 10A is a diagram depicting the field structure of a message including a pseudonym, according to an exemplary embodiment.

In exemplary embodiments, a message includes an identifier S associated with the sending wireless node 101, the count j of messages that S has sent since the beginning of the current period, a pseudonym X and the encrypted message text Y (see discussion with respect to FIG. 10A for additional details of a message structure). Some messages (e.g., queries) maybe sent without Y. For example, a fresh pseudonym X can be derived by the sending node from these fields and identifier (e.g., S, j, X) with $F_K$, a one-way derivation function keyed to the authentication key "K":

$$X = F_K(S,j) \quad \text{(Equation 1)}$$

A receiving wireless node 101 that is a member of the same community would have the same authentication key K and be able to recognize that the message originated from its community by checking if Equation 1 holds. This method provides a high degree of privacy: assuming that the pair S, j is different for each message, X computed by Equation 1 may take any value from [0, $2^\xi$–1], resulting in $2^\xi/M \approx 10^{12}/M$ where M equals the number of queries created by members of the community within a fixed period of time and $\xi$ equals a number of bits of X (e.g., 40 bits). However, a receiving node that is a member of n private communities would have to compute Equation 1 up to n times for each incoming message. For instance, when the wireless node 101 that is a member of 200 private communities hears 50 messages a second on the average over its radio interface, and each message contains a single pseudonym, then the wireless node 101 will have to compute Equation 1 up to ten thousand times per second.

Allowing a sustained rate of ten thousand computations per second conflicts with the goal of having a long battery life for the wireless node 101. Therefore, the system 100 uses another approach for generating pseudonyms in which a list of k community pseudonyms $\{X_0, \ldots, X_{k-1}\}$ is periodically precomputed by each member of the private community independently, and the index i of the identifier from the list of pseudonyms that the sending node, for instance, inserts into a query message is determined by the sending node's network identity S:

$$i = H(S) (\bmod\, k) \quad \text{(Equation 2)}$$

where H(•) is a hash function (i.e., i is an integer-valued function of S with range [0, k–1]. It follows from Equation 2 that a single pseudonym $X_i$ will be used by a sending node, as long as the sender's network identity S and the list of precomputed pseudonyms $\{X_0, \ldots, X_{k-1}\}$ stay the same.

The function H(•) should have a domain whose size is at least k, and the distribution of its outputs within that domain should be uniform. For instance, the linear congruential random number generators provided by the device's operating system could be used to implement Equation 2.

It is noted that if k is a power of two, then i can be obtained by simply copying any $\log_2 k$ bits of H(S). Moreover, if the distribution of S is sufficiently close to uniform for the purpose of choosing i, then Equation 2 can be reduced to:

$$i = S (\bmod\, k) \quad \text{(Equation 3)}$$

The value of X in a reply message is taken from the query message that has triggered the reply. In system 100, an outsider can link responses to queries by observing the source and the destination fields in message headers. Thus, different pseudonyms in query and response messages would not improve privacy. The advantage of this approach is that the time for finding if a pseudonym X from a given message is one of the previously precomputed pseudonyms, can be optimized by existing search techniques. For instance, if the n precomputed pseudonyms that correspond to a given i are stored in a sorted array, then binary search in O(log(n)) time per message may be used. With more sophisticated data structures the search can be done in O(1) time; i.e. in practice, the worst case search time will be independent of n.

However, as described below, the lookup time depends on the variety in the values of k that may be used by different communities. For that reason, the possible values of k are, for instance, limited (e.g., k can be one of $k_1, k_2, \ldots, k_N$).

One disadvantage of using a single pseudonym per sending node within the same period is that the number of sender's memberships n, is directly observable: e.g., it equals the number of different X's in messages sent by that node. Knowledge of n can then be used to trace that node. The node could hide its number of memberships by creating and sending decoy messages with random pseudonyms in addition to sending its normal messages. However, the sending of decoy messages consumes extra energy and thus shortens the devices' battery life.

As mentioned above, community members in the same ad-hoc mesh network 109 may be linked based on replies to each other's queries. Another potential disadvantage of using a precomputed list of k pseudonyms is that if k is smaller than the number of community members, then at least two members will have to use the same pseudonym. Those members may be then linked even when they are physically in different networks.

In summary, the amount of real-time computation per message performed by a node in separating its communities messages from all the messages that it hears over the radio interface, will depend not on n, the number of communities in which that node is a member, but on the number of different values of k used by those communities, which is at most N.

When k is large compared to M, the sending node may hide its number of memberships n by choosing a community pseudonym at random from the set $\{X_0, \ldots, X_{k-1}\}$ for each one of its queries: i.e., the index i is an integer-valued function of message-specific fields of the message in addition to S, with range [0, k–1].

Thus, instead of Eq. (2) the sender can compute the index i with one of:

$$i = H(S \oplus j)(\bmod\, k) \quad \text{(Equation 4)}$$

$$i = H(S \oplus j \oplus Y)(\bmod\, k) \quad \text{(Equation 5)}$$

or, $$i = S \oplus j \oplus Y (\bmod\, k) \quad \text{(Equation 6)}$$

where $\oplus$ denotes the bitwise XOR operation; and padding, e.g., with zeroes, is used to equal the length of its $\oplus$ operands. It is noted that the modulus k in Equation 4 should not exceed the number of values that the seed $S \oplus j$ of the pseudorandom number generator may take during one period; otherwise, that computation will produce less than k values of the index i.

However, if k is expected to be small compared to typical M, then changing the pseudonym in every query would quickly reveal the whole set $\{X_0, \ldots, X_{k-1}\}$ and allow an external observer to trace other members of same community for as long as the set of pseudonyms remains the same.

Use of data structures that provide constant search time enables another embodiment of the invention: A list of k community pseudonyms $\{X_0, \ldots, X_{k-1}\}$ that is periodically precomputed by each member of a private community independently, and the index i of the identifier from that list that the sending node inserts into a query message is chosen at random by the sending node 101a:

$$i = H(R)(\bmod\, k), \quad \text{(Equation 6a)}$$

where R is a random number, known only to the sending node and H(•) is a hash function; i.e., i is an integer-valued function of R with range [0, k−1]. The sending node 101a could keep R constant for the whole period, or it could generate new value of R for each message, or it could change a new value of R whenever it changes the network identity S. It follows from Eq. (6a) that a single pseudonym $X_i$ will be used by a sending node 101a, as long as the sender's random number R and the list of precomputed pseudonyms $\{X_0, \ldots, X_{k-1}\}$ stay the same.

In exemplary embodiments, community pseudonyms change periodically (e.g., daily). The following describes a process for changing pseudonyms. T denotes the number of seconds since a fixed time reference that is common for the wireless nodes 101 within the ad-hoc mesh network 109 (e.g., the beginning of Jan. 1, 1970); L denotes the smallest period's length in seconds; and t denotes the period's number. Within each period, a constant number k of pseudonyms are used by the community, where k≥1. By way of example, the value of L in system 100 is 86,400 seconds, i.e. the number of seconds in one day. The period number t is an unsigned integer representing the value T in days whose size is four bytes and is computed by:

$$t = T/L \qquad \text{(Equation 7).}$$

where "/" is integer division, and e.g., t is the number of days since Jan. 1, 1970.

Note that it is also contemplated that t may be a multiple of L (e.g., if the period is 2L then t should be replaced with t/2 in Eq. 10 below). This opens the possibility of varying the validity time of pseudonyms between different communities. For instance, some communities could change pseudonyms every L seconds, while other communities change every 2L seconds.

Communication delay in the system 100 is the sum of (1) the message propagation time from sending to receiving node, and (2) the difference between the values of T in communicating nodes. The symbol Δ denotes the highest communication delay for which all time-dependent computations in the network nodes provide a correct output. In system 100, Δ is one second less than L/2:

$$\Delta = L/2 - 1 \qquad \text{(Equation 8).}$$

Accordingly, the values of t in communicating nodes may differ only by ±1 if Equation 8 is true. L is the same for all network nodes. In addition, a private community can choose one k from the N possible values $k_1, k_2, \ldots, k_N$, where $k_1 < k_2 < \ldots < k_{N-1} < k_N$.

In exemplary embodiments, two keys, A and B, are derived once per period L from the authentication key K of the community: A is used for generating community pseudonyms and B for data encryption. As used herein, $F_K$ denotes a generic derivation function, keyed with key K. In this notation, $$A = F_K(C, t, \text{"privacy"}),$$

$$B = F_K(C, t, \text{"confidentiality"}), \qquad \text{(Equation 9).}$$

where C denotes the value of the community identifier CID. In system 100, the key derivation function $F_K$ is a Hash-based Message Authentication Code using the SHA256 hash function (HMAC-SHA-256), where the input is constructed as specified in Annex B2 of the 3GPP TS 33.220, version 6.13.0, "3rd Generation Partnership Project; Technical Specification Group Services and System Aspects; Generic Authentication Architecture (GAA); Generic Bootstrapping Architecture," incorporated herein by reference in its entirety. The input parameters for deriving the keys A and B are listed below. For example, the input format of parameter $P_i$ follows [1]: It is a pair $P_i$, $L_i$, where $L_i$ is a length of $P_i$. The length of $L_i$ is two bytes. Those parameters are concatenated into a single string $FC \| P_0 \| L_0 \| P_1 \| L_1 \| P_2 \| L_2$, which is fed into the derivation function.

FC=0x01;
$P_0$="privacy" when deriving A; "confidentiality" when deriving B;
$L_0$=0x00 0x07 when deriving A, 0x00 0x10 when deriving B;
$P_1$=C;
$L_1$=0x00 0x08;
$P_2$=t;
$L_2$=0x00 0x04.

Note that in $P_0$, the hexadecimal value of the ASCII string "privacy" is 0x70 0x72 0x69 0x76 0x61 0x63 0x79; the hexadecimal value of the ASCII string "confidentiality" is 0x63 0x6f 0x6e 0x66 0x69 0x64 0x65 0x6e 0x74 0x69 0x61 0x6c×69 0x74 0x79. It is contemplated that the key derivation may also be performed using any other appropriate mechanism.

A member of private community that has identifier C, will generate from C the k community pseudonyms that are valid for a period number t as follows:

$$X_i = F_A(C, t, i) \qquad \text{(Equation 10)}$$

where i is, for instance, an unsigned integer of four bytes that takes the values $0, 1, \ldots, k-1$. The identifiers can be precomputed ahead of time, at $t_0 < t$. In system 100, $F_A$ is Advanced Encryption Standard (AES, November 2001, Federal Information Processing Standards Publication 197, incorporated herein by reference in its entirety). The string composed from concatenated inputs C, t, and i is encrypted using AES with key A; and the identifier Xi equals to the five most significant bytes of the result.

A member of n private communities: $C_1, C_2, \ldots, C_n$, can store pseudonyms and other parameters in, for instance, a table with a row per community. An example of such table for a single period t and n=3 is shown in Table 1.

TABLE 1

| | |
|---|---|
| $C_0$ | $K_0 A_0 B_0 X_{00}$ |
| $C_1$ | $K_1 A_1 B_1 X_{10} X_{11} X_{12} X_{13}$ |
| $C_2$ | $K_2 A_2 B_2 X_{20} X_{21} X_{22} X_{23}$ |

In the example of Table 1, community $C_0$ uses one pseudonym per L seconds, while communities $C_1$ and $C_2$ both use four pseudonyms per L seconds. By way of example, v denotes the number of different k's used by communities in which a node participates: v≤N, where N is a system parameter indicating the possible number of k's. The list of those k's arranged in increasing order is $k_1, k_2, \ldots, k_v$: $k_1 < k_2 < \ldots < k_{v-1} < k_v$. When a message containing a pseudonym X is received, the node 101 will get at most v values of i: $i_1, i_2, \ldots, i_v$, by applying Eq. (2) v times. The node 101 will then search the columns indexed by those values of i for a matching pseudonym. Therefore, the table lookup time for a given message is proportional to v.

Since the values of t in communicating nodes may differ by ±i, every node 101 maintains, for instance, multiple sets of precomputed parameters (e.g., three sets of precomputed parameters: for t−1, t and t+1; those sets are denoted by $x_{-1}$, $x_0$ and $x_1$, respectively).

By way of example, to send a message m to members of a private community C, the community layer 205:

(1) looks up the parameters for C for the current period t;
(2) encrypts the message m with key B to obtain ciphered text Y: Y=$E_B$(m), where $E_B$ is the authenticated encryption function AES-EAX (e.g., the EAX mode of operation for the encryption function AES, described in "The EAX Mode of Operation," M. Bellare, P. Rogaway, and D. Wagner, 2004, incorporated herein by reference in its entirety) and where the initial value (IV) of the AES-EAX function is a concatenation of S, C, t, and j:

$$IV = S \| C \| t \| j \quad \text{(Equation 11);}$$

and (3) computes the index i by Eq. (2). For example, the sent message contains S, j, $X_i$, Y, and the least significant bit of t: $t_1$. In certain embodiments, the inclusion of the least significant bit of t: $t_1$ reduces the processing time for determining C in other nodes 101.

By way of example, AES-EAX is a block cipher that generates a sequence of bits from B and IV, and then applies bitwise XOR operation, $\oplus$, on the clear-text input and on the generated sequence to obtain the encrypted text. In exemplary embodiments, the value of IV does not repeat as long as the encryption key B stays the same because using the same B, IV pair for encrypting different messages creates potential security weaknesses. The diversity of IV within a single time period is maintained by having a different value of message counter j for each sent message; the diversity of IV in different periods is maintained by the changing value of t. For example, the value of j may roll over and repeat within a single period. In exemplary embodiments, the size of j is two bytes, and so the network node has to produce more than 216/L, or 0.76 messages per second, for j to repeat. Sustained message rates of such magnitude from a single node 101 are unlikely in the system 100.

Nevertheless, before the message counter j rolls over and while t stays the same, the sender, for instance, generates a new network identity S', resets message counter j to zero, and uses S' as the identity of the wireless node 101 in subsequent communication. For example, the new identity S' is chosen uniformly at random in $(0, 2^{\sigma-1})$, where $\sigma$ is the number of bits in S. After identity change, responses to queries that the node has made under its previous identity S will be still routed towards that node, as long as other network nodes keep entries created by those queries in their routing tables.

Alternatively or in addition, the uniqueness of IV is maintained with the aid of a rollover counter r. The sending node 101 sets r to zero in the beginning of each period and increments r by one after each rollover of j within a single period. By way of example, $r_\rho r_{\rho-1}, \ldots, r_1$ the sequence of bits in r. The least significant bit of r: $r_1$, is sent inside the bit vector of flags in each message. Wireless nodes 101 use $\oplus r_1$ instead of S in the computation of IV:

$$IV = (S \oplus r1) \| C \| t \| j \quad \text{(Equation 12).}$$

In this way, the uniqueness of IV is maintained for $2 \times 2^{16}$ instead of $2^{16}$ messages per time period. In the unlikely case of j rolling over more than once per period t, the network node 101, for instance, stops sending messages until the end of that period to maintain the uniqueness of IV.

As part of receiving a message containing a pseudonym, t' denotes the time period in the sending node 101 when it creates a message. The value t represents the time period in a network node 101 when it receives that message. The values t'1 and t1 are the least significant bits of t' and t. The receiver maintains a Boolean variable h that indicates whether the receiver is in the first or second half of the current period. The variable h, for instance, is zero from the beginning to the middle of the current time period, and one from the middle to the end of the current time period as follows:

(1) if $t'_1 = t_i$, then $t_1 = t$;

(2) if $t_1 \neq t'_1$ and $h = 0$, then $t' = t - 1$; and (3) if $t_1 \neq t'_1$ and $h = 1$, then $t' = t + 1$ \quad (Equation 13).

Next the node 101 sets $k = k_1$ and performs the following steps:
(1) Computes the index i by Eq. (2);
(2) Chooses x from the three sets $x_{-1}$, $x_0$, and $x_{+1}$ of precomputed parameters for community;
(3) Searches if X in the message matches a pseudonym in the ith column of the table: $X = X_{ui}$, where $0 \leq u \leq n$; and
(4.1) If a match $X = X_{ui}$ is found, and the message contains encrypted text Y, then the receiver can decrypt Y with the key $B_u$ to obtain the message m: $m = D_{Bu}(Y)$, where in the function $D_{Bu}$ is AES-EAX with the initial value IV constructed by Eq. (11) with the values of S and j taken from the message and t replaced by t':

$$IV = S \| C \| t' \| j, \quad \text{(Equation 14);}$$

(4.2) If a match $X = X_{ui}$ is found, and the message does not contain Y, then the receiver sends a reply encrypted with Bu to the sender and repeats steps 1-5 with the next value of k from the list.
(5) If a match $X = X_{ui}$ is not found, then the receiver repeats steps 1-5 with the next value of k from the list.

Computation (12) of sender's node 101a period number t' is based on the assumption that $\Delta < L/2$. It can be verified that (12) will produce a correct value of t' as long as this assumption holds: An indication that the sending node's and the receiving node's period numbers are different, i.e. $t_1' \neq t_1$, together with the assumption $\Delta < L/2$, imply that $t' = t - 1$ when the receiver node 101b is in the first half of its period; and that $t' = t + 1$ when the receiver node 101b is in the second half of its period. If this assumption does not hold, then the receiver node 101b may fail to respond to the sender's node 101a message due to incorrect calculation of i.

Knowledge of $t_1'$ by the receiver reduces the overall message processing time roughly by a factor of three: A network node without knowledge of $t_1'$ would have to search three sets of precomputed parameters: $x_{-1}$, $x_0$ and $x_1$, in the worst case. If the difference between the values of T in communicating nodes is negligible, then a message received in period t can originate either in the same or the preceeding period: t' is either t, or t-1. In this case, knowledge of $t_1'$ by the receiver reduces the overall message processing time roughly by a factor of two.

In summary, the assumption of $\Delta < L/2$ allows us to send only a single bit of the period number t in each message, instead of, for example, having to send the whole of t. This reduces message transmission time, which results in increased battery life of the devices: Sending only part of t may save up to four percent of transmission time, given that the size of t is four bytes and the average message size is 100 bytes.

Under certain conditions, a collision occurs when for some index i and period t, the pseudonym $X_{ui}$ of community $C_u$ equals to the pseudonym $X_{vi}$ of a different community $C_v$: $X_{ui} = X_{vi}$. There are two ways in which a collision may affect a network node.

First, a network node 101b that is a member of both $C_u$ and $C_v$ will have two identical entries in column i of its table. When a query message with community pseudonym $X_i$ arrives, it will match both of those entries in step 4 above.

If the message contains an encrypted text Y, then the node 101b will try to decrypt it first with one of the keys $B_u$, $B_v$, and if that fails with the keys from the other entry; it will find out which one of $C_u$ or $C_v$ is communicating based on which one of those decryption succeeds. But if there is no Y in the message, then the node cannot know whether $C_u$ or $C_v$ is the source of the message until further communication takes place. The node 101b will have to reply twice: one reply will contain text encrypted with $B_u$ and the other will contain text encrypted with $B_v$. In this case the collision will be resolved by the node 101a that sent the original query.

Second, a network node 101b that is a member of only one of $C_u$ or $C_v$, may receive messages with matching identifier $X_i$ that are intended for members of the other community. Also in this case the collusion can be resolved by the receiving node when the message contains Y and by the originating node 101a otherwise.

In certain embodiments, The receiver node 101b searches to determine if there is a match of X in the ith column of the table: $X=X_{ui}$, where $1 \leq u \leq n$ and i depends on the received message. The search will take at most n comparison operations. To speed the lookup the receiving node 101b could maintain n copies of the table, such that the rows in copy u are sorted according to column u: A binary search in a sorted column of n items will take at most $\log_2(n)$ comparison operations. For instance if n=128, there will be at most seven comparison operations per message.

Figure 10B:
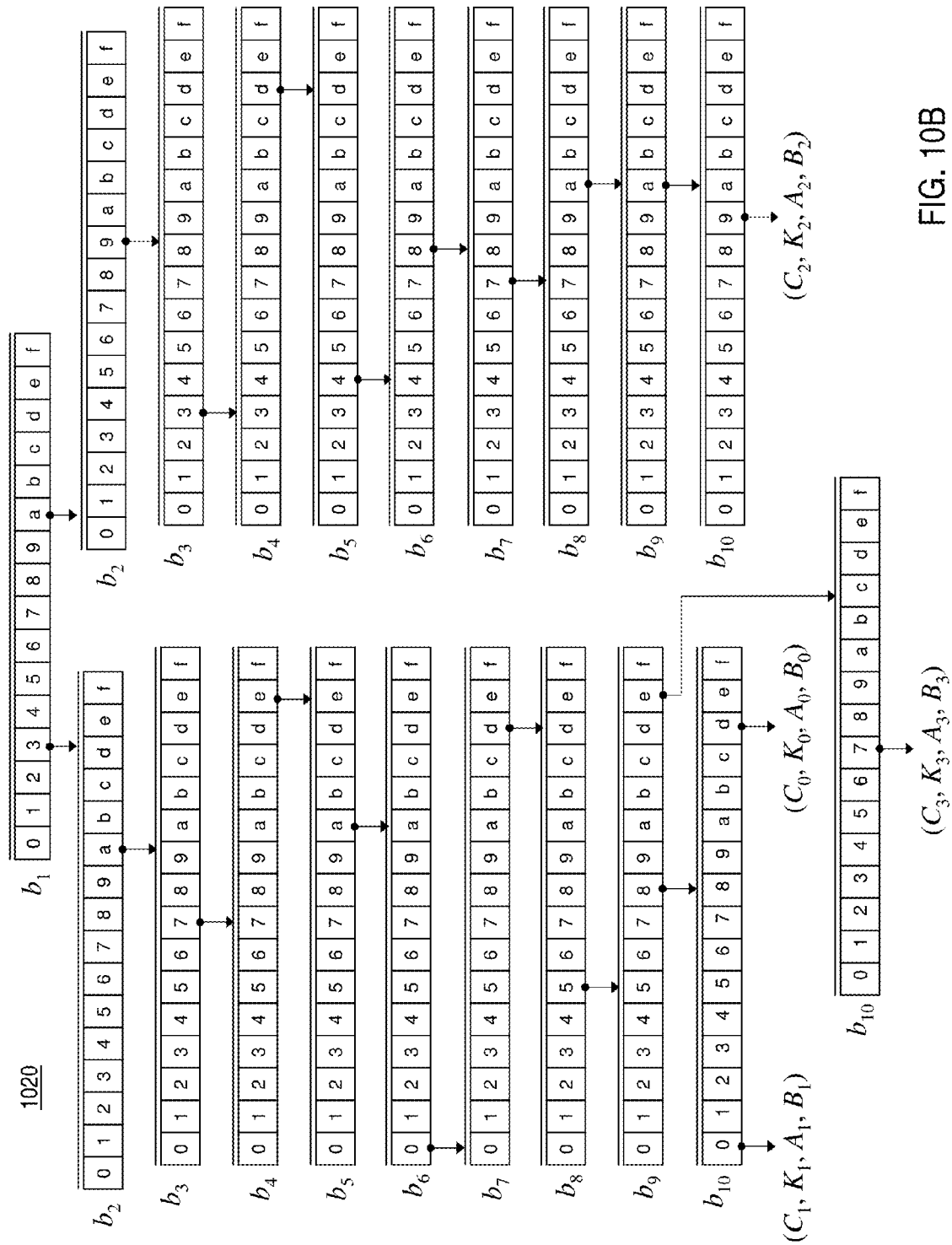
FIG. 10B is a diagram of a digital trie data structure for storing pseudonyms, according to an exemplary embodiment.

A more efficient search can be also achieved by storing the pseudonyms $X_{i1}, X_{i2}, \ldots, X_{in}$ in a hierarchical data structure, for example a digital trie (see discussion with respect to FIG. 10B for additional discussion of trie data structure). The set of precomputed values $X_{i1}, X_{i2}, \ldots, X_{in}$ could be stored in a trie as follows: Each X in that set is encoded as a string of a constant length $\beta$ over an alphabet of a symbols; $\alpha \geq 2$ and $\beta \leq \xi$. When n pseudonyms are stored in a trie, the time needed to check if X taken from a message is one of those identifiers is determined by $\beta$; it is a constant independent of n.

For instance, when $\xi$ is 40 bits, setting $\alpha=16$ results in representation of X as a string often hexadecimal digits:
$X=b_1 b_2 b_3 b_4 b_5 b_6 b_7 b_8 b_9 b_{10}$,
where $b_i$ is one of $\{0, 1, 2, \ldots 9, a, b, c, d, e, f\}$.

To achieve a constant search time, the storage of the n strings representing the precomputed values of X for a given index i, is organized in a hierarchy of records: A hexadecimal digit is stored in a record containing 16 fields. The value of each field is either "empty", or a pointer to the next record, or a pointer to the community data $(C_v, K_v, A_v, B_v)$, which is the search result if the device is a member of $C_v$. "Empty" field means that the corresponding value of the digit is not stored; it will abort the search with negative result.

Figure 2D:
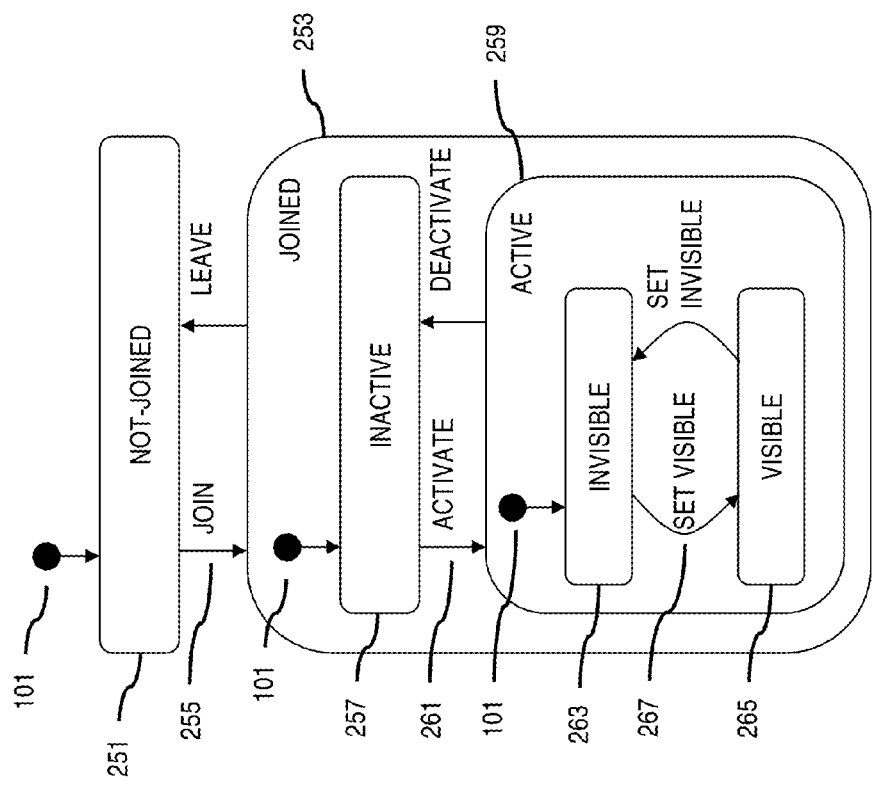

FIG. 2D is a state diagram of the effect of community membership and status on sharing awareness information, according to an exemplary embodiment. As shown in FIG. 2D, a wireless node 101 may be in either one or two states (e.g., a not-joined state 251 and a joined state 253) with respect to membership in a community within the ad-hoc mesh network 109. The application 201 of wireless node 101 issues, for instance, a command 255 to either join or leave a community to transition between the not-joined state 251 and the joined state 253. When the wireless node 101 is in the not-joined state 251 with respect to a community, the wireless node 101 has no information (e.g., CID and associated authentication keys K) about the community and cannot access messages directed to the community. When the wireless node 101 is in the joined state 253, the community layer 205 receives the CID and possibly one or more authentication keys associated with the community. In one embodiment, authentication keys are provided when membership in the community is by invitation or otherwise restricted (e.g., when the community is a personal community or a private community). Accordingly, the community layer 205 will be able to encrypt outgoing community specific messages and to decrypt incoming community specific messages.

When the wireless node 101 is in the joined state 253, the wireless node 101 may also be in either an inactive state 257 or an active state 259. To transition between the inactive state 257 and the active state 259, the application 201 may issue a command 261 to either activate or deactivate the joined state 253 via the application programming interface 225. When the wireless node 101 is in the inactive state 257, the community layer 205 abandons the message even though it is a member of the community. In certain embodiments, the wireless node 101 may also be invisible to other members of the community while in the inactive state 257. For example, the wireless node 101 may enter the inactive state 257 when it temporarily does not want to receive or share information with the community. When the wireless node 101 is in the active state 259, the community layer 205 encrypts and decrypts community messages as usual for private communities, and enables all outgoing and incoming community specific messages for public communities (e.g., communities with no restrictions on membership).

Within the active state 259, the wireless node 101 may also be in either an invisible state 263 or a visible state 265. To transition between the invisible state 263 and the visible state 265, the application 201 issues a command 267 to set either the visible or invisible state. When in the invisible state 263, the community-specific identity (e.g., a user alias) associated with the wireless node 101 cannot be queried by other members of the community. For example, in the invisible state 263, the community layer 205 continues to receive and send community messages without its identity known to other community members. When in the visible state 265, the identity of the wireless node 101 can be queried by other members of the community.

In various embodiments, the community directory 243 of the community layer 205 maintains, for instance, information on the communities that the user has joined. Such information contains, at least, the community identification (CID). Additionally, it may contain public and/or private authentication keys (K) of the joined communities and a list of anonymized community identifiers for each community. The community control module 241 may periodically recalculate the list of anonymized CIDs. By way of example, the community layer 205 inserts a header into the message it receives from the cognition layer 203. The header contains, for instance, a list of anonymized community identifiers identifying the communities to which the message is relevant.

Figure 2E:
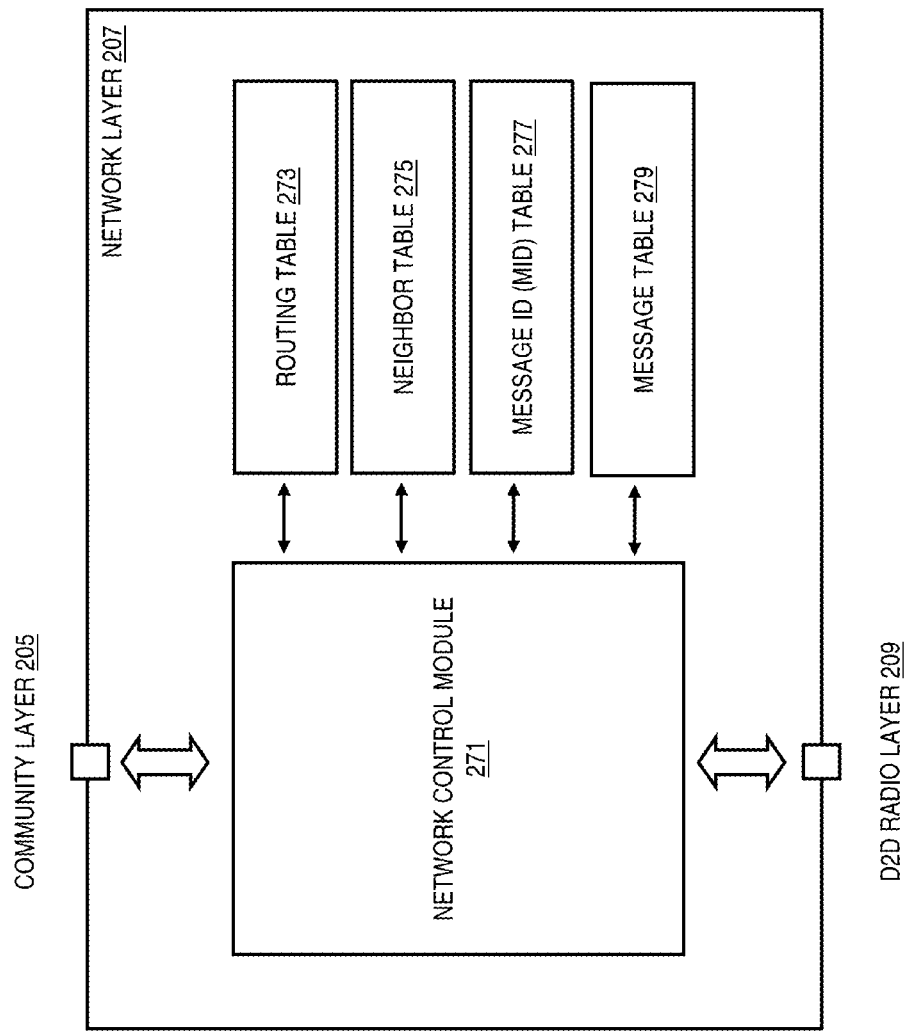

As shown in FIG. 2C, the community layer 205 has connectivity to the cognition layer 203 above and the network layer 207 below. The network layer 207 manages the rebroadcasting of received flooding messages and the routing of the unicast (typically reply) messages received by the wireless node 101. FIG. 2E depicts a diagram of the components of the network layer 207, according to an exemplary embodiment. The network layer 207 includes a network control module 271, routing table 273, neighbor table 275, message identification (MID) table 277, and message table 279. The network control module 271 directs the broadcasts of messages and information by managing and updating the routing table 273, neighbor table 275, MID table 277, and message table 279. In certain embodiments, the network control module 271 may also assist in protecting the privacy and anonymity of users by periodically changing the network layer identification associated with the wireless node 101. It is noted that making such a change in the network layer identification between queries does not cause routing problems for replies because the routing information is recreated by each query in the ad-hoc mesh network 109.

In exemplary embodiments, the network layer 207 may insert a header into messages it receives from the community layer 205 to, for instance, direct flooding and routing of the received messages. The structure of this network layer message header 281 is discussed with respect to FIG. 2F. FIG. 2F is a diagram of the data structure of a network layer message header, according to an exemplary embodiment. As shown, the message header 281 contains the following fields: (1) a TX field 282 to identify the transmitter node ID (NID) of the last transmitting node 101; (2) a SRC field 283 to identify the source node ID of the node 101 that originated the message; (3) a DST field 284 to identify the destination source ID of the intended recipient of a unicast (reply) message (e.g., this field is give a value of zero when the message is a flooding messages); (4) a MSN field 285 to identify the message sequence number assigned by the source node; and (5) a hop count field 286 that is incremented by one by each node 101 that transmits the message. In certain embodiments, the message header 281 may also contain the following optional fields: (6) a geographical limit field 287 to designate the extent of the physical over which the message is intended to propagate (e.g., the geographical limit field 287 may contain a geographical position of the source node and a maximum flooding radius from that position); (7) a temporal limit field 288 (e.g., the temporal limit field 288 may contain the time when the message becomes obsolete and should be dropped); and (8) a context limit field 289 that defines the context beyond which the message is not intended to propagate (e.g. a message related to a particular concert is not intended to extend beyond the concert venue).

Returning to FIG. 2E, the network layer 207 also contains a routing table 273. In exemplary embodiments, the routing table 273 contains a listing of the node identification number (NID) of the originating wireless node 101 (e.g., source NID) and the NIDs of the last known transmitters of the message. The purpose of the routing table is to enable the routing of the reply messages (e.g., unicast messages) back to the querying node that originated the query through a flooding message. As the message propagates through the ad-hoc mesh network 109, each subsequent wireless node 101 that receives the message adds the NID of the last transmitter to the routing table to record the next hop neighbor towards the source node. The source node is marked as the destination node (DST) in the routing table. Also the message sequence number of the message is recorded. The update of the routing table 273 is coordinated by the network control module 271. As shown in Table 1, the routing table 273 lists the destination NID, the transmitter NIDs associated with wireless nodes 101 that have rebroadcasted a message and the MSN of the message.

TABLE 1

| Destination NID | Transmitter NIDs | Message Sequence Number |
| --- | --- | --- |
| $DST_1$ | $TX_{11}, TX_{12}, \ldots, TX_{1M}$ | $MSN_1$ |
| $DST_2$ | $TX_{21}, TX_{22}, \ldots, TX_{2N}$ | $MSN_2$ |
| ... | ... | ... |
| $DST_S$ | $TX_{S1}, TX_S, \ldots, TX_{ST}$ | $MSN_S$ |

The neighbor table 275 contains a list of the neighboring wireless nodes 101 and an estimate of their relative radio distance (see Table 3). It is contemplated that the observed signal strength together with the known transmitting power of a neighboring wireless node 101 is an indicator of the proximity of the wireless node 101 and can be used to calculate the relative radio distance. The relative radio distance of the node from which the message was last received is then used as a criterion for whether or not the wireless node 101 retransmits a received message. For instance, a higher signal strength indicates closer proximity to the wireless node 101. The network control module 271 monitors the signal strengths of neighboring nodes 101 as the module 271 receives messages from nearby devices and uses it to estimate the relative radio distance (e.g., proximity of the transmitting node 101). It is also contemplated that the network control module 271 may use any other mechanism for estimating the relative radio distance of neighboring nodes (e.g., estimating location using global positioning satellite receivers or other positioning techniques).

In certain embodiments, the network control module 271 uses the proximity information to direct the routing and transmission of messages over the ad-hoc mesh network 109. For example, the system 101 can reduce the potential for overloading the ad-hoc mesh network 109 by implementing a smart flooding scheme whereby only a few nodes 101 retransmit a flooding message. Whether a node 101 retransmits a flooding message can be dependent on the relative distance group (e.g., "very near", "near", or "far") to which the node 101 that is the transmitter of the message belongs. More specifically, if the transmitting node 101 is in the "far" or "near" group, the receiving node 101 can retransmit the flooding message. If the transmitting node 101 is in the "very near" group, the receiving node 101 does not retransmit the flooding message. For each broadcast message received from a node in either the "far" or "near" group, the network control module 271 assigns a random delay time for relaying or rebroadcasting. The delay period, for instance, exhibits a distribution function based on the estimated relative radio distance as a way to randomize the delay period before transmission. The distribution should be chosen in such a way that the random delay is larger for those nodes that are "near" than for those that are "far." This favors, for instance, nodes 101 that are further away to relay the flooding message forward, which results in better flooding efficiency (smaller total number of transmissions). The use of a random delay time also prevents the unintended synchronization of message broadcasts as the message propagates over the ad-hoc mesh network 109. For example, unintended synchronization of the message broadcasts may result in too many nodes 101 sending broadcasting (i.e., flooding) messages over the ad-hoc mesh network 109 at exactly the same time. Additionally, the delay time provides an opportunity for the network control module 271 to monitor and count rebroadcasts of the message by other neighboring wireless nodes 101.

TABLE 2

| Transmitter NID | Relative Radio Distance |
| --- | --- |
| $TX_1$ | $D_1$ |
| $TX_2$ | $D_2$ |
| ... | ... |
| $TX_T$ | $D_T$ |

The MID table 277 contains a list of received messages. As the wireless node 101 receives messages from neighboring nodes over the ad hoc mesh network 109, the network control module 271 uses the MID table to check whether the message has been received previously by, for example, comparing the MIDs in the MID table 277 to that of the received message. The MID table 277 also contains a flag indicating whether a message has been transmitted by the node 101 and the time when the entry was last updated. In exemplary embodiments, the MID is the tuple (SRC, MSN), where SRC is the NID of the source node and MSN is a message sequence number assigned by the source node. In this way, the MID is a unique identifier of each message that propagates in the network 109. The network control module 271 makes an entry in the MID table 277 for all new messages that it receives. If the message has been scheduled for transmission, the module 271 increments the message counter in the message table (see Table 4).

TABLE 3

| MID | Sent flag | Time of reception |
| --- | --- | --- |
| $(SRC_1, MSN_{11})$ | "SENT" | $t_{11}$ |
| $(SRC_1, MSN_{12})$ | "NOT SENT" | $t_{12}$ |
| ... | ... | ... |
| $(SRC_2, MSN_{21})$ | "NOT SENT" | $t_{21}$ |

The message table 279 contains messages that the network control module 271 has scheduled to transmit. For example, as the node 101 receives a flooding message that the network control module 271 schedules for transmission, the module 271 updates the message table to include the message in the message table 279. Each entry in the message table 279 contains the message itself, the time when the message is scheduled to be sent, and the number of receptions of the same message by the node 101 (see Table 4). In exemplary embodiments, a message is not relayed over the ad-hoc mesh network 109 if the number of times the message has been received exceeds a predefined limit. For example, a message has the initial count of 0. In this example, as a wireless node 101 in the neighborhood is observed to transmit the message, the message count associated with the message is increased. When the maximum message count is reached, the network control module 271 removes the message from the message table 279. The transmitter of each message is also associated with an estimated relative radio distance (D) indicating whether the transmitting node is within close proximity of the wireless node 101 (e.g., transmitting node 101 is in the "very near" relative radio distance group) or far from the wireless node 101 (e.g., transmitting node 101 is in the "far" relative radio distance group). If the relative radio distance associated with the transmitting node indicates that the transmission of the message occurred "very near," the wireless node 101 would not have to relay the message because it is assumed, for instance, that most of the other neighboring wireless nodes 101 have already received the same message. By taking into account the relative radio distances of neighboring nodes, the described smart flooding functionality leads to, on average, each flooding message being received for a few times by each node 101 independent of the node density. The number of times a message is received by any one node 101 affects the scalability of the network 109.

If the received message, however, is a unicast reply message that was addressed to the receiving node 101, the network control module 271 checks whether the destination node 101 can be found in the routing table 273 (e.g., can be found from the destination field in the reply message, or obtained from the source field of the query by the replying node). If found, the routing table entry will give the NID of the neighboring node to which the reply message will be sent in the next opportunity. If the unicast transmission is not successful, the next entry for the same DST will be used as the next try. If the received message is a unicast reply message that not addressed to the receiving node, and no acknowledgment from the intended receiver node was heard, the node will store the message in the message table 279 for scheduled retransmission. It is noted that unicast messages or acknowledgement messages that are not addressed to the node 101 are normally received D2D radio layer 209 (see discussion of the D2D layer 209 below) but not by the awareness services module 111. However, under certain circumstances, the D2D radio layer 209 can provided such messages to the awareness services module 111 to schedule for retransmission. For example, if no successful unicast of the same message is observed by the time when the message is scheduled to be transmitted, the node 101 will transmit the unicast or acknowledgement message to the intended recipient found from the routing table 273 associated with the message. In this way, the nodes 101 that are not the intended recipients of the reply messages can assist in routing the message forward towards the correct destination.

TABLE 4

| Message | Time to send | Received msg count |
| --- | --- | --- |
| $MSG_1$ | $t_1$ | $C_1$ |
| $MSG_2$ | $t_2$ | $C_2$ |
| ... | ... | ... |
| $MSG_M$ | $t_M$ | $C_M$ |

As shown in FIG. 2A, the awareness services module 111 has connectivity to a device-to-device (D2D) radio layer 209. The D2D radio layer 209 enables the formation of the ad-hoc mesh network 109 and sharing of awareness information using, for instance, short range radio technologies such WLAN and Bluetooth®. It is contemplated that the D2D radio layer 209 may use any wireless technology for communication between devices over short ranges. The radio technology, for instance, enables each wireless node 101 within the ad-hoc mesh network 109 to broadcast messages in a connectionless way to the neighboring nodes 101 that are within radio range. As used herein, the term "connectionless" means the wireless nodes 101 need not use two-way signalling to establish a communication channel before broadcasting a message. In exemplary embodiments, the D2D radio layer 209 may include multiple radios using one or more different technologies or protocols (e.g., WLAN and Bluetooth® simultaneously). A wireless node 101 configured with multiple radios may act as a gateway node to span two or more sub-networks serviced by the different wireless technologies. In this way, messages broadcast on one sub-network may be propagated to another sub-network.

Figure 2G:
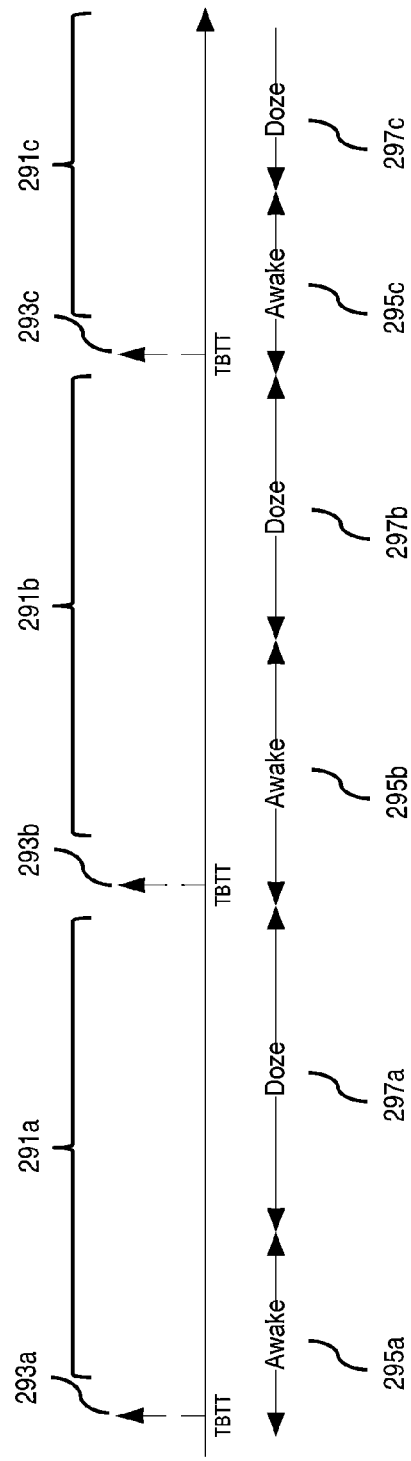
FIG. 2G is a diagram depicting a power saving scheme of a device-to-device radio layer.

FIG. 2G is a diagram depicting a power saving scheme of a device-to-device radio layer, according to an exemplary embodiment. The small amount of awareness data as well as the low latency requirements of the system 100 enables the operation of the D2D radio layer 209 in a way that leads to low power consumption. As shown in FIG. 2G, the D2D radio layer 209 may have beaconing periods 291*a*-291*c* delineated by target beacon transmission times (TBTTs) 293*a*-293*c*. In exemplary embodiments, the D2D radio layer 209 may operate in a time-synchronized manner and utilize only a fraction of the time for active communication (e.g., during awake periods 295*a*-295*c*). During the rest of each beaconing period 281, the D2D radio layer 209 is in, for instance, a power-saving or dozing mode (e.g., during doze periods 297*a*-297*c*). For example, each beaconing period 291 can be on the order of hundreds of milliseconds and each awake period 293 only a few milliseconds, leading to effective radio utilization of approximately one percent. It is contemplated that for situations, where the number of nodes 101 is very large (such as during mass events), time-wise radio utilization can increase up to 100 percent momentarily (e.g., awake period 293 equals active transmission period 291). At times of low traffic (for example at night), the radio utilization can be decreased to, for instance, 0.1 percent, by utilizing every tenth awake period 293 while still maintaining synchronization.

Figure 9:
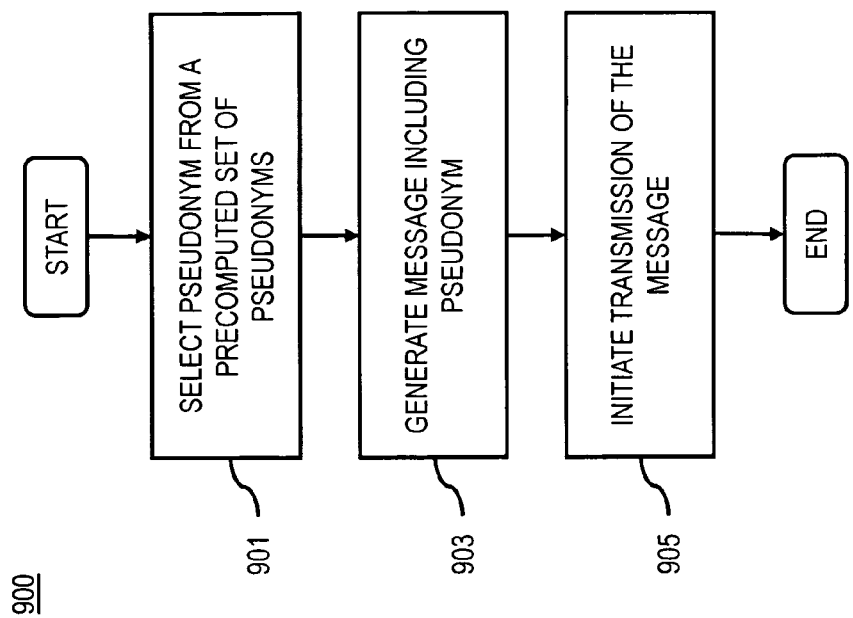
FIG. 9 is a flowchart of a process for transmitting a message including a pseudonym, according to an exemplary embodiment.

In exemplary embodiments, the low latency requirements also enable saving power in the host processor (e.g., as depicted in FIG. 9). For illustration, the following description refers to the components of exemplary chip set of FIG. 9. The D2D radio layer 209 is typically implemented in the ASIC module 909, whereas the functionalities of the awareness service module 111 can be implemented either in the ASIC 909 or the processor 903. If the functionalities of the awareness service module are implemented in the processor 903, power consumption is reduced by, for instance, having ASIC 909 wake up the processor 903 as infrequently as possible. By way of example, the periodic operation of the D2D radio layer 209 explained above enables the ASIC 909 to collect all messages and send them to the processor 903 at a frequency of once per active transmission period 281. The processor 903 then processes all received messages and calculates new messages to be sent for the next active transmission period 281. The processor 903 then sends the messages to the ASIC 909 for transmission. Using this process, a flooding message can make one hop (e.g., travel from one node 101 to another node 101) per period 281, which is fully acceptable for awareness information. In contrast, potential delays of hundreds of milliseconds are not possible, for example, for voice traffic, and these kinds of power savings cannot therefore be achieved in other communication systems transporting delay-sensitive traffic.

Figure 3A:
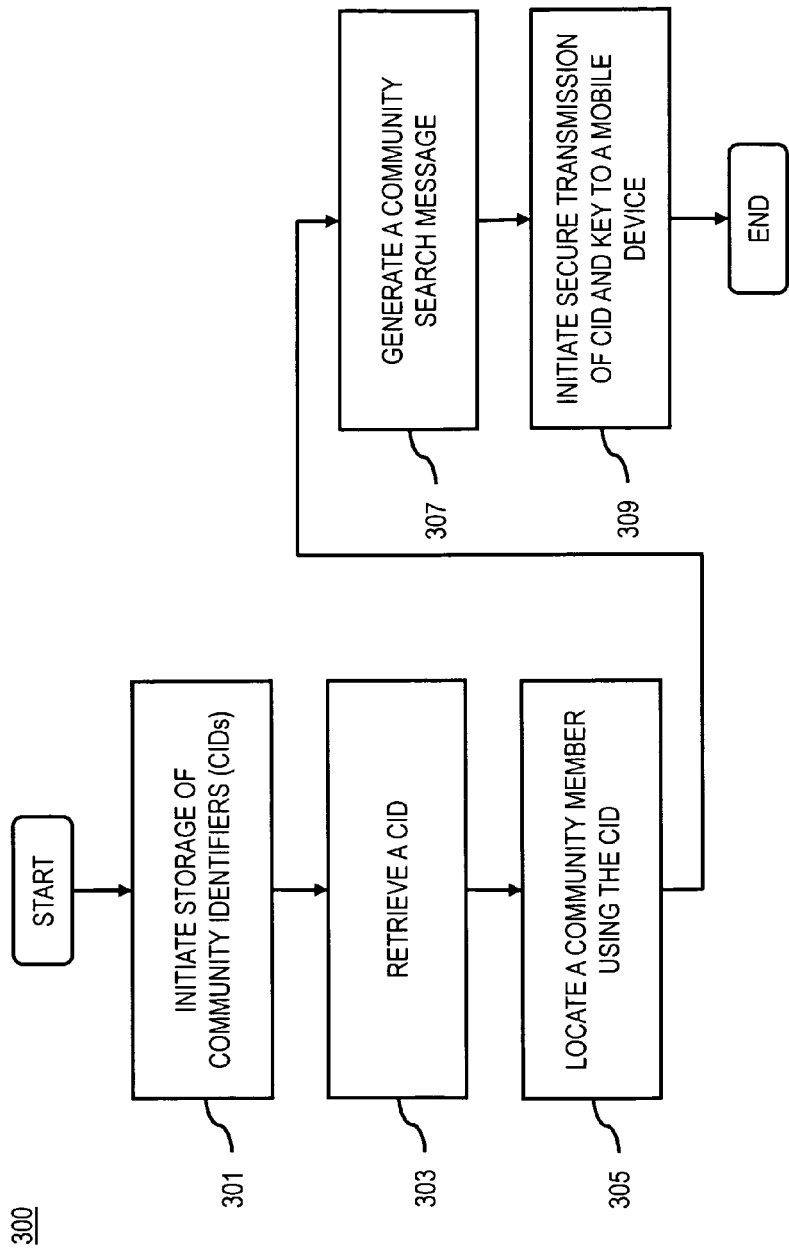
FIG. 3A is a flowchart illustrating initializing a wireless node for locating communities or community members over an ad-hoc mesh network, according to an exemplary embodiment of the present invention.
Figure 3C:
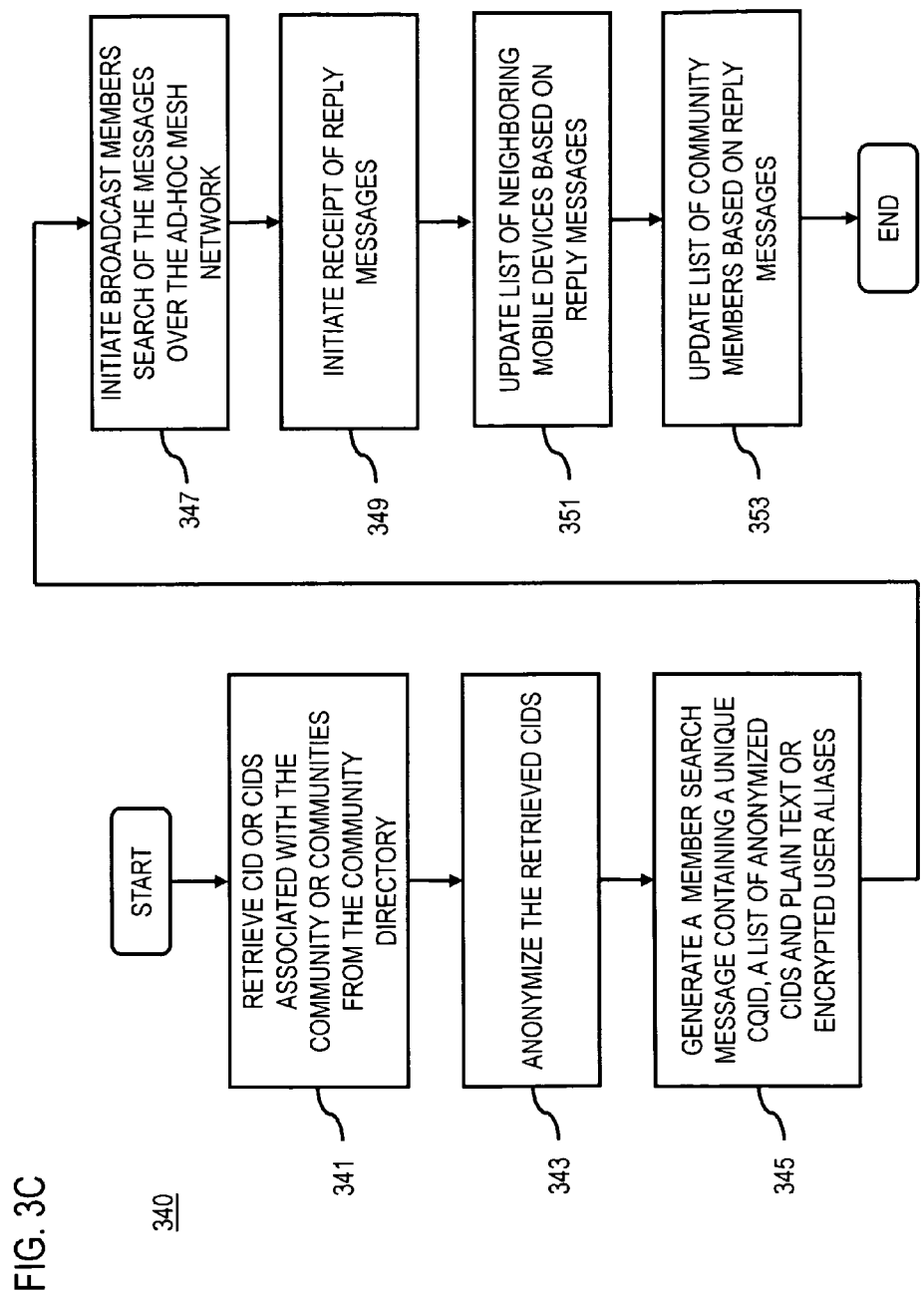
FIG. 3C is a flowchart illustrating a process for locating one or more members of a particular community or communities, according to an exemplary embodiment of the present invention.

FIGS. 3A-3C are flowcharts of processes for locating communities and community members over an ad-hoc mesh network, according to various exemplary embodiments. FIG. 3A is a flowchart for initializing a wireless node 101 for locating communities or community members over an ad-hoc mesh network, according to an exemplary embodiment. In one embodiment, the awareness services module 111 performs the process 300 of FIG. 3A and is implemented in, for instance, a chip set including a processor and a memory as shown in FIG. 9. In step 301, the awareness services module 111 initiates storage of one or more community identifiers (CIDs) corresponding respectively to one or more communities of mobile devices. In exemplary embodiments, each CID is associated with one or more authentication keys for authenticating members and messages transmitted within the community. The CIDs and associated keys are stored by the awareness services module 111 in the community directory 243 and may be provided to the mobile devices in advance using, for instance, a secure communication channel over the ad-hoc mesh network 109 or the communication network 103. CIDs and keys that are created subsequently may also be provided using a secure communication channel over either the ad-hoc mesh network 109 or the communication network 103.

As part of the initialization process, the awareness services module 111 identifies neighboring wireless nodes 101 within the local ad-hoc mesh network 109 using the process as described with respect to FIG. 2D. For example, the process of identifying neighboring wireless nodes 101 includes determining whether over a predetermined period of time, one or more of the neighboring wireless nodes 101 has transmitted or received a community specific message where the wireless node 101 is either the source, sender, receiver, or destination of the message. If a wireless node 101 has transmitted or received such a message, the awareness services module 111 classifies that particular wireless node 101 as a neighboring node 101 that is visible to the particular community related to the message. Based on these determinations, the awareness services module 111 creates a list neighboring wireless nodes 101 (e.g., mobile devices) that are visible to a particular community (e.g., responsive to messages to or from a particular community) (step 303).

From this list of visible neighboring nodes 101, the awareness services module 111 also determines and creates a list of which of the visible neighboring nodes 101 are members of a particular community (step 305). This determination is performed, for instance, using the process described with respect to the FIG. 2D. More specifically, the awareness services module 111 determines that a visible neighboring wireless node 101 is also a member of a particular if the neighboring wireless node 101 has received a community specific query or replay message from another community member specifically addressed or referring to the neighboring wireless node 101.

FIG. 3B is a flowchart of a process for determining whether there are wireless nodes 101 that are members of one or more specific active communities, according to an exemplary embodiment. In one embodiment, the awareness services module 111 performs the process 320 of FIG. 3B and is implemented in, for instance, a chip set including a processor and a memory as shown in FIG. 9. In step 321, the awareness service module 111 retrieves a CID for each active community that will be determined by the search (step 321). For example, the awareness services module 111 can retrieve the one or more CIDs from the community directory 243. The awareness services module 111 then anonymizes the retrieved CIDs using the process as described with respect to FIG. 2C (step 323). Anonymizing the CIDs protects the privacy of community members by making it more difficult for an outsider to track communications related to any particular community. The community control module 241 then generates a community search message containing a containing a unique community query identifier CQID and a list of anonymized CIDs (step 325).

After creating the message, the awareness services module 111 initiates broadcast of the message over the ad-hoc mesh network 109 (step 327). In exemplary embodiments, the member search message is equivalent to a query and is transmitted and replied to using the processes described with respect to FIGS. 5A-5C below. As the message propagates over the ad-hoc mesh network 109, mobile devices that are members of one or more of the active communities associated with the anonymized CID or CIDs included in the message automatically respond to mobile device that originally sent the message. The awareness services module 111 initiates receipt of the reply messages (step 329). The reply message includes, for instance, a list of anonymized CIDs for active communities in the replying node. In certain embodiments, the awareness services module 111 also uses the reply messages to update the list of neighboring mobile devices (step 331). This update is based, for instance, on the replying node identification (NID) included in the reply messages.

FIG. 3C is a flowchart of a process for locating one or more members of a particular community or communities, according to an exemplary embodiment. In one embodiment, the awareness services module 111 performs the process 340 of FIG. 3C and is implemented in, for instance, a chip set including a processor and a memory as shown in FIG. 9. In step 341, the awareness services module 111 retrieves the CID or CIDs associated with the community or communities from the community directory 243. If any one of the communities is configured to make its members visible and searchable, then the awareness services module 111 also retrieves the user alias for each community member to be located. By way of example, the encryption/decryption module 245 of the wireless services module 111 anonymizes the retrieved CIDs and in case of a private community encrypts any user aliases (step 343). The encryption/decryption module 245 performs the anonymization and encryption using, for instance, the one or more keys associated with each CID. The community control module 241 then generates a member search message containing a unique community query identifier CQID, a list of anonymized CIDs, and plaintext (in case of a public community) or encrypted (in case of a private community) user aliases (step 345).

After the member search message is generated, the awareness services module 111 initiates broadcasts members search message over the ad-hoc mesh network 109 (step 347). In exemplary embodiments, the member search message is equivalent to a query and is transmitted and replied to using the processes described with respect to FIGS. 5A-5C below. As the message propagates over the ad-hoc mesh network 109, mobile devices that have one or more communities associated with the anonymized CID or CIDs in the state where members are visible automatically respond to mobile device that originally sent the message. The awareness services module 111 initiates receipt of the reply messages sent in response to the member search message. The reply message includes, for instance, a list of anonymized CIDs, plaintext or encrypted user aliases and the plaintext or encrypted status (e.g. presence) of the community member (step 349). In certain embodiments, the awareness services module 111 also uses the reply messages to update the list of neighboring mobile devices (step 351) and the list of community members (step 353). The updates are based, for instance, on the replying node identification (NID) and community information included in the reply messages.

In addition to locating communities and community members, the awareness services module 111 can also invite other mobile devices to join a particular community. To invite another mobile device to join a community, the awareness services module 111 initiates a secure transmission of the CID of the community along with one or more of the associated keys to the mobile device using either the ad-hoc mesh network 109 or the communication network 103. On acceptance of the CID and keys by the receiving mobile device (e.g., indicated by storage of the CID and keys in the mobile device), the mobile device becomes part of the community will be able to receive any messages, including encrypted messages, originating from members of the community.

Figure 4:
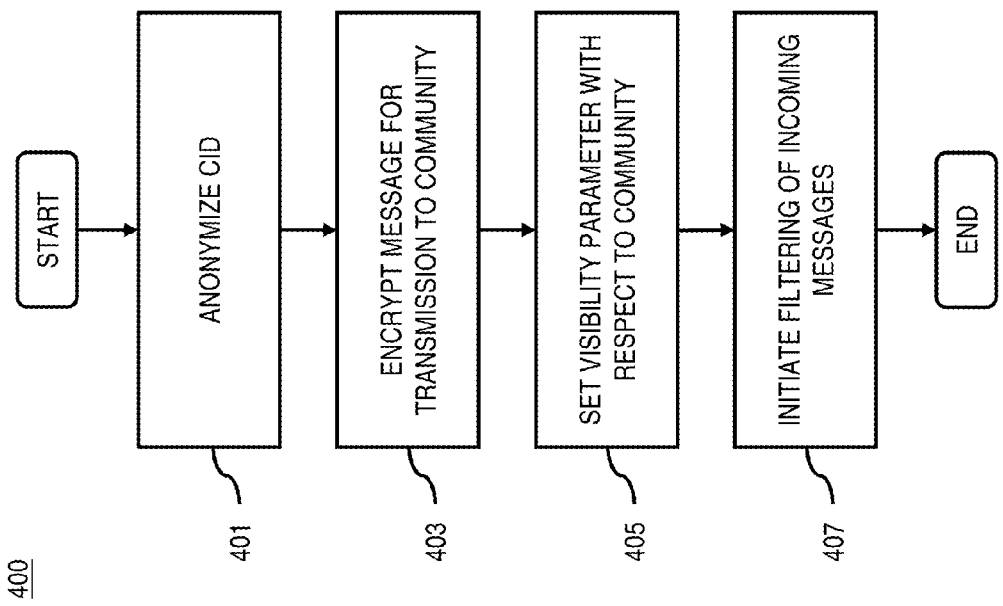
FIG. 4 is a flowchart of a process for protecting the privacy and anonymity of a community, according to an exemplary embodiment.

FIG. 4 is a flowchart of a process for setting a state of a community to change the visibility of community or community member, according to an exemplary embodiment. In one embodiment, the awareness services module 111 performs the process 400 and is implemented in, for instance, a chip set including a processor and a memory as shown in FIG. 9. In step 401, the awareness services module 111 enables the user to set a state corresponding to a community that determines the visibility of the community or a member of the community. The different states of the community and how the state affects the visibility of status of the community are discussed with respect to FIG. 2D. For example, in various embodiments, when a community is visible, the community is in an active state and capable of sending and receiving community specific messages. Similarly, when a community member is visible, the user alias associated with the community member can be queried and sent to other community members only (e.g., when the community is private) or to any querying node 101 (e.g., when the community is public).

Moreover, it is contemplated that the visibility state of a community or community member can be used to filter incoming messages. For example, to block all incoming or outgoing messages, a community member can set the member's own state to inactive with respect to the community so that all messages from that particular community are disregarded. It is contemplated that the a user belonging to multiple communities may independently set the visibility state for each community. By way of example, to block incoming advertisements, the user can set its visibility state to inactive for the community sending the advertisements. It is also contemplated that the user can automatically set the visibility state based on criteria such as time (e.g., to automatically set a visibility state at certain periods of the day), location (e.g., to automatically set a visibility state at certain locations such as work or school), or any other content (e.g., while in a meeting or at dinner).

Figure 5A:
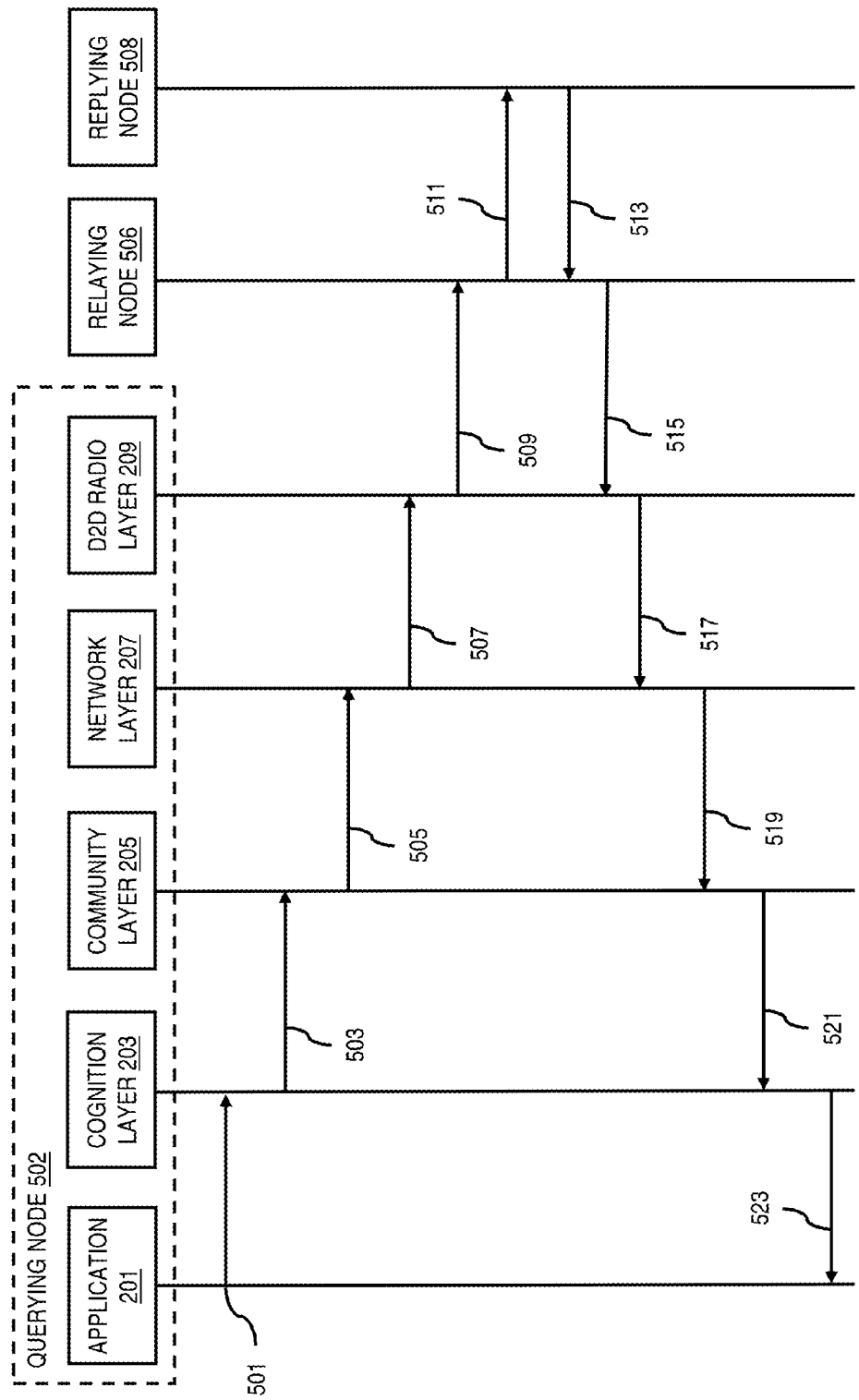
FIG. 5A is a ladder diagram that illustrates a sequence of messages and processes used in a querying node, according to an exemplary embodiment.

FIG. 5A is a ladder diagram that illustrates a sequence of messages and processes used in a querying node, according to an exemplary embodiment. A network process is represented by a thin vertical line. A step or message passed from one process to another is represented by horizontal arrows. A dashed horizontal arrow represents an optional step or message. The processes represented in FIG. 5A are the querying node 502, relaying node 506, and replying node 508. Within querying node 502, the following additional processes are represented: application 504, cognition layer 203, community layer 205, network layer 207, and D2D radio layer 209.

In step 501, the application 201 within querying node 502 generates a request for searching information over the ad-hoc mesh network 109 and sends the request to the cognition layer 203 of the querying node 502. The cognition layer 203 generates a query message, assigns a query identification number (QID) to the query message and forwards the query message to the community layer 205 of the querying node 502 (step 503).

The community layer 205 prepares the query message for transmission over the ad-hoc mesh network 109 by marking the query with a CID of the community from which the user is seeking information. If the community is private, the community layer 205 encrypts the query message using the authentication keys associated with the respective CID and stored in the community directory 243 (FIG. 2C). The community layer 205 then anonymizes the CID attached to the query using the authentication keys associated with the respective CID and sends the anonymized and possibly encrypted messaged to the network layer 207 (step 505).

The network layer 207 assigns a message sequence number (MID) to the query message and adds fields to the network layer message header 291 (FIG. 2F) to indicate that the querying node 502 is the source and transmitter of the query message (e.g., using the NID). The network layer 207 sends the query message to the D2D radio layer 209 of the querying node 502 for broadcasting to the ad-hoc mesh network 109 (step 507).

The query message is then broadcasted to one or more relaying nodes 506 (step 509). All the nodes that are able to receive the broadcast message are relaying nodes. The processes of the relaying node are described with respect to FIG. 5B. After processing by the relaying node 506, the query message is rebroadcasted to another relaying node or to the replying node 508 (step 515). The processes of the replying node 508 are described with respect to FIG. 5C. After processing of the query message by the replying node 508, a reply message is generated and sent to the relaying node 506 (step 513) which routes the reply message either to another relaying node or to the querying node 502 (step 515) based on the route stored in the routing table 273.

At the querying node 502, the D2D radio layer 209 receives and acknowledges the reply message and forwards the reply message to the network layer 207 (step 517). The network layer 207 determines that the querying node 502 is the intended destination of the reply message by checking the DST field 294 in the network layer message header 291 and sends the message to the community layer 205 for processing (step 519). In case of a private community, the community layer 205 decrypts the reply message using the appropriate authentication keys stored in the community directory 243. Then the community layer 205 sends the decrypted reply message to the cognition layer 203 (step 521). The cognition layer 203 then provides the application 201 with a service response using the content of the reply message and the QID contained in the reply message (step 523).

Figure 5B:
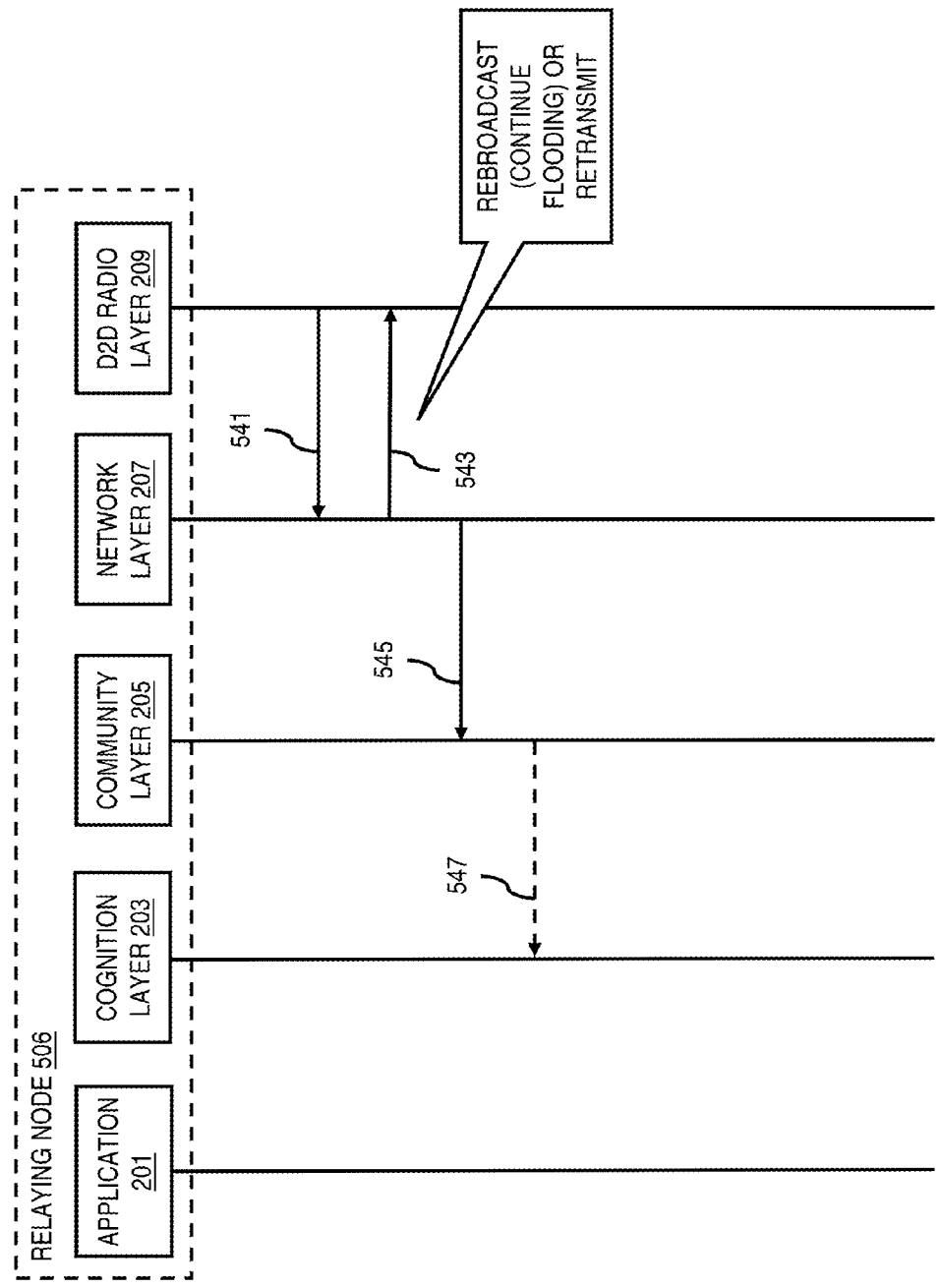
FIG. 5B is a ladder diagram that illustrates a sequence of messages and processes used in a relaying node, according to an exemplary embodiment.

FIG. 5B is a ladder diagram that illustrates a sequence of messages and processes used in a relaying node, according to an exemplary embodiment. A network process is represented by a thin vertical line. A step or message passed from one process to another is represented by horizontal arrows. A dashed horizontal arrow represents an optional step or message. The processes represented in FIG. 5B are the application 201, cognition layer 203, community layer 205, network layer 207, and D2D radio layer 209 of the relaying node 506.

In step 541, the D2D radio layer of the relaying node 506 receives a query message either from the querying node 502 or from another relaying node and sends the message to the network layer 207. The network layer performs the steps 323 to 329 (FIG. 3B) to determine whether to rebroadcast the query message. If the network layer 207 decides to rebroadcast the query, it sends the query message back to the D2D radio layer 209 for transmission (step 543).

The network layer 207 also forwards the query message to the community layer 205 (step 545). If the community layer 205 determines that the query message contains the anonymized CID of an active community associated with the relaying node 506 based on the information stored in the community directory 243 (FIG. 2C), the community layer decrypts the message and forwards it to the cognition layer 203. In this example, the relaying node 506 does not have any matching information in the item storage 223 (FIG. 2B) and serves only to relay the query message.

In an other example, in step 541, the D2D radio layer of the relaying node 506 receives a reply message either from the replying node 508 or from another relaying node and sends the message to the network layer 207. The network layer performs the steps 423 to 435 (FIG. 4B) to determine whether to retransmit the reply message. If the network layer 207 decides to retransmit the reply, it sends the reply message back to the D2D radio layer 209 for transmission (step 543).

The network layer 207 also forwards the reply message to the community layer 205 (step 545). If the community layer 205 determines that the reply message contains the anonymized CID of an active community associated with the relaying node 506 based on the information stored in the community directory 243 (FIG. 2C), the community layer decrypts the message and forwards it to the cognition layer 203 that may store the information in the reply message in its item storage 223.

Figure 5C:
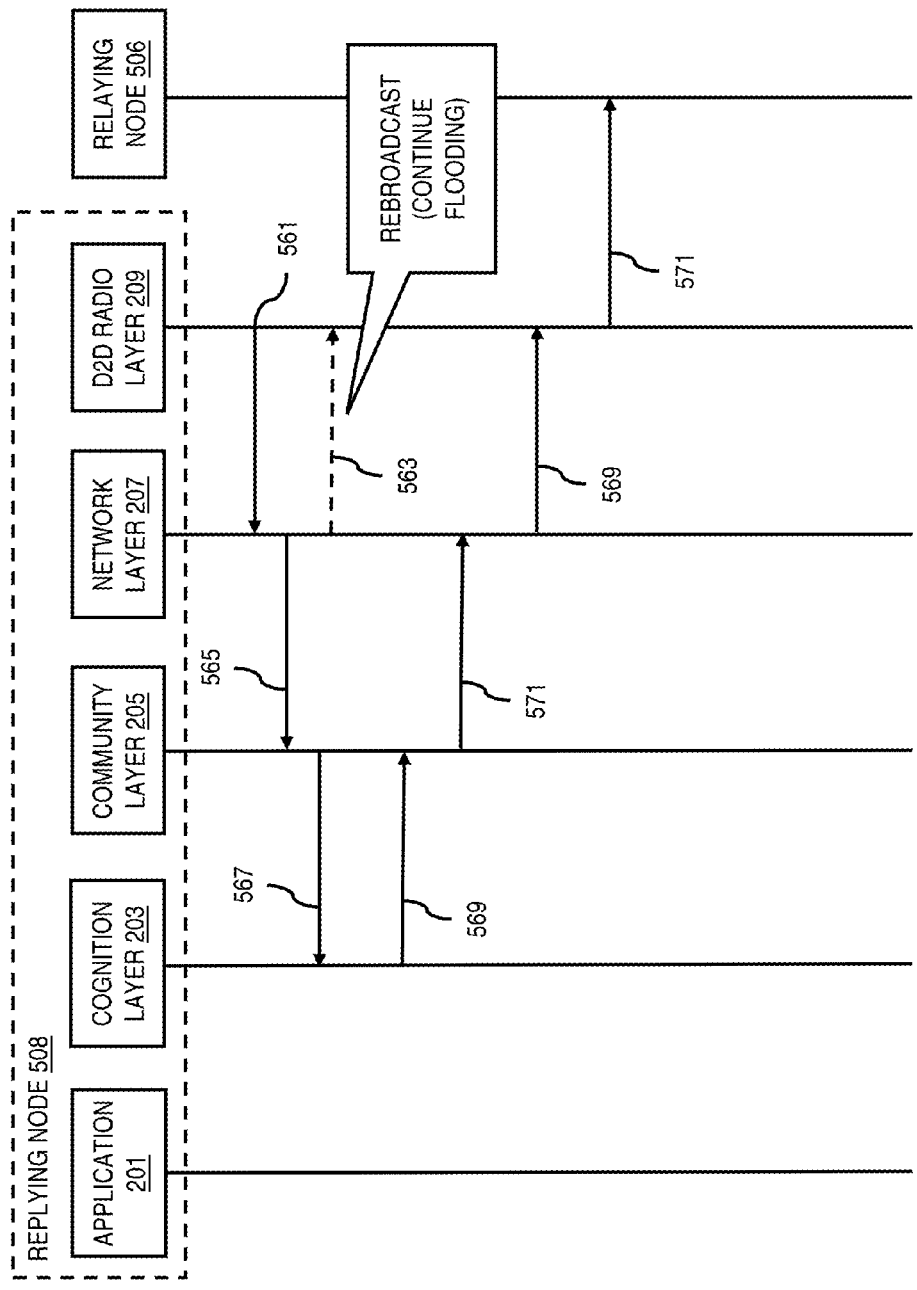

FIG. 5C is a ladder diagram that illustrates a sequence of messages and processes used in a replying node, according to an exemplary embodiment. A network process is represented by a thin vertical line. A step or message passed from one process to another is represented by horizontal arrows. A dashed horizontal arrow represents an optional step or message. The processes represented in FIG. 5C are the replying node 508 and the querying node 502. Within replying node 508, the following additional processes are represented: application 201, cognition layer 203, community layer 205, network layer 207, and D2D radio layer 209.

In step 561, the D2D radio layer 209 of the replying node 508 receives the query message and forwards it to the network layer 207 of the replying node 508 according to the same process as described with respect the relaying node 506 of FIG. 5B. The network layer 207 may decide to rebroadcast the query message (step 563). On receipt, the network layer 207 forwards the query message to the community layer 205 (step 565).

If the community layer 205 determines that the query message contains an anonymized CID of an active community associated with the replying node 508, the community layer 205 decrypts the message, if private, and forwards the query message to the cognition layer 203 (step 567). If an item matching to the query is found in the item storage 223 of the replying node 508, the cognition layer generates a reply message that contains the same QID as the incoming query and has the source NID of the query message set as the destination NID of the reply message. Next, the cognition layer forwards the message to the community layer 205 (step 569). If the community to which the reply message relates to is a private community the reply message is encrypted using the keys associated with the community. The community layer 205 then anonymizes the community identifier CID and sends the reply message to the network layer 207 (step 571).

On receipt of the reply message, the network layer 207 assigns a new message sequence number (MSN) to the reply message, attaches NID of the replying node 508 as the source and transmitter, finds the NID of the relaying node 506 for the next hop from the routing table 263, sets the target NID of the reply message as the next hop and sends the reply message to the D2D radio layer 209 (step 569). The D2D radio layer 209 sends the reply message as a unicast message addressed to a relaying node 506 over the ad-hoc mesh network 109.

Figure 6A:
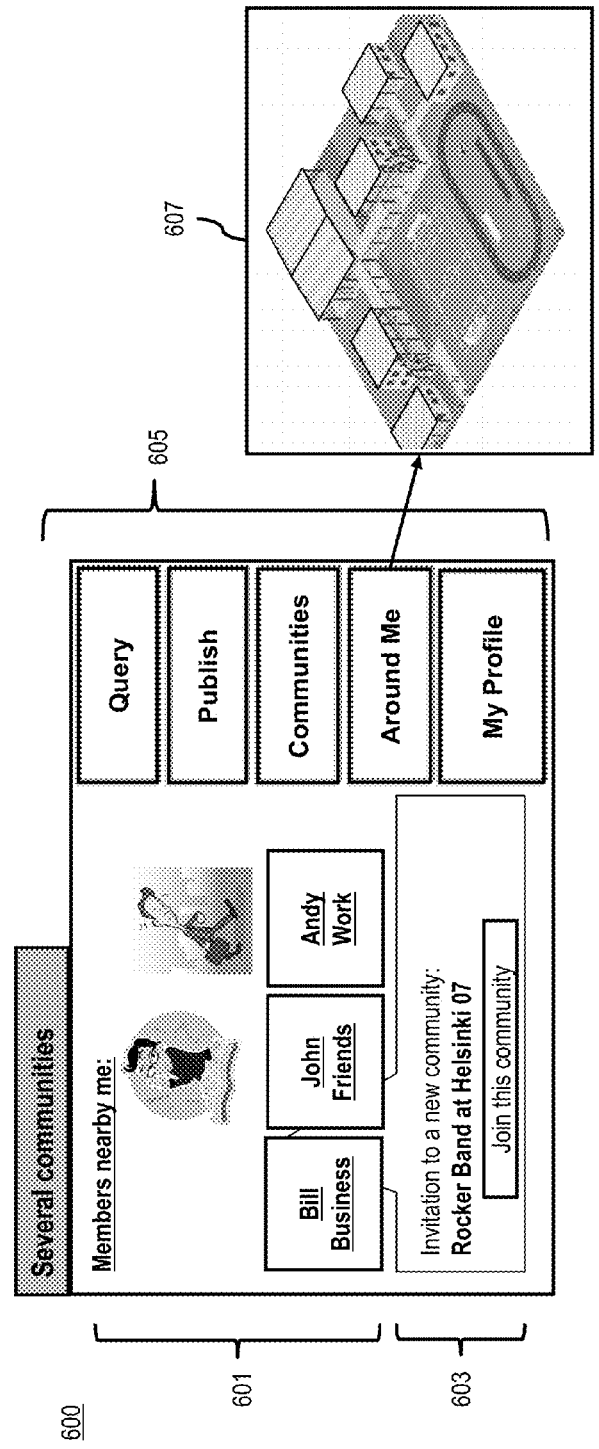
FIGS. 6A-6B are diagrams of a user interface utilized in the process of locating communities over an ad-hoc mesh network, according to various exemplary embodiments.
Figure 6B:
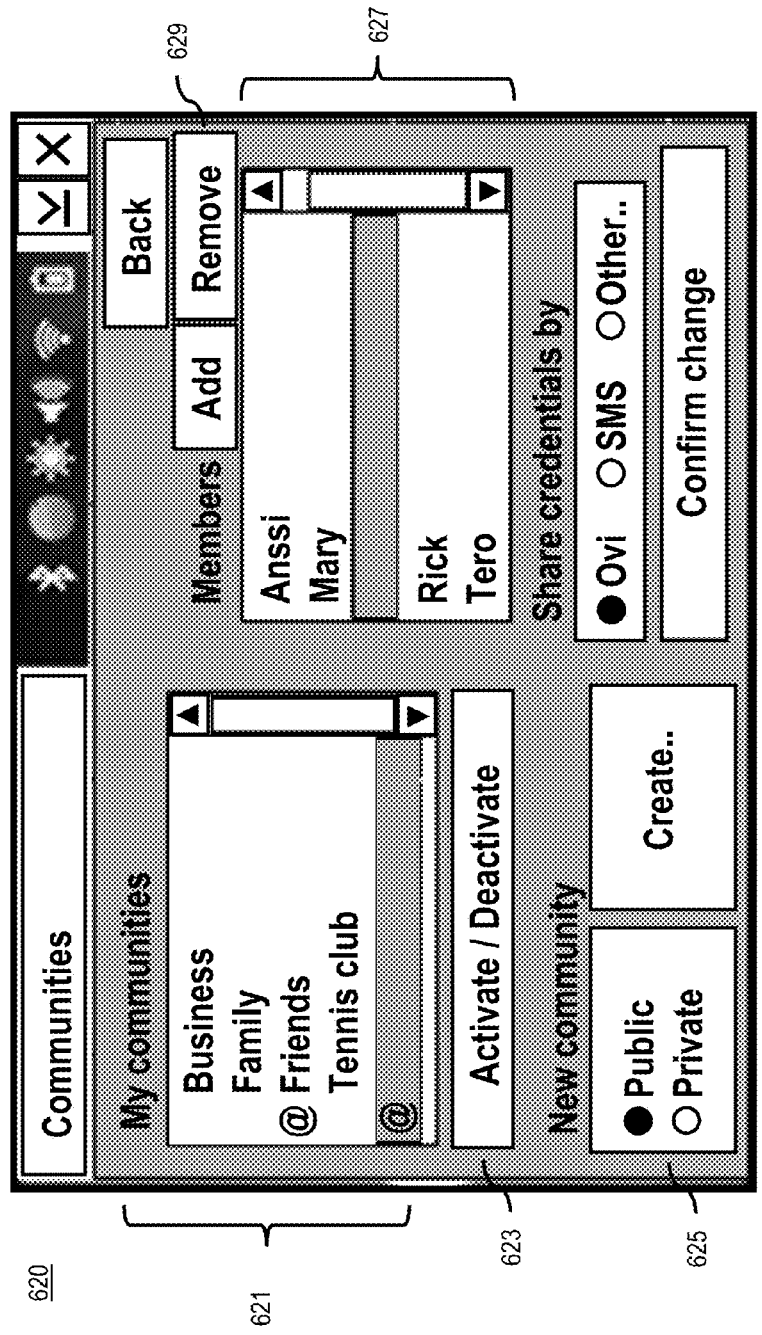

FIGS. 6A-6B are diagrams of a user interface utilized in the process of locating communities over an ad-hoc mesh network, according to various exemplary embodiments. FIG. 6A depicts a user interface 600 listing community related information and commands for managing and accessing awareness information. For example, section 601 lists community members who are nearby the wireless node 101. The members may be from one or more different communities. Selecting a member enables a user to contact the member, view the status of the member, or access other applications or functions related to the user. Section 603 may display, for instance, status commands or prompts such as an invitation to join a particular community. User interface 600 also provides selectable menu options 605 to initiate additional commands. For example, selecting the option "Around Me" prompts the display of a map 607 with the locations of community members.

FIG. 6B depicts a user interface 620 for managing communities. For instance, section 621 displays currently defined communities with an option 623 to activate or deactivate each community individually. Users may also designate each community as either public or private using the control 625. Members of each community are displayed in section 627, along with controls 629 for adding or removing members.

Figure 7:
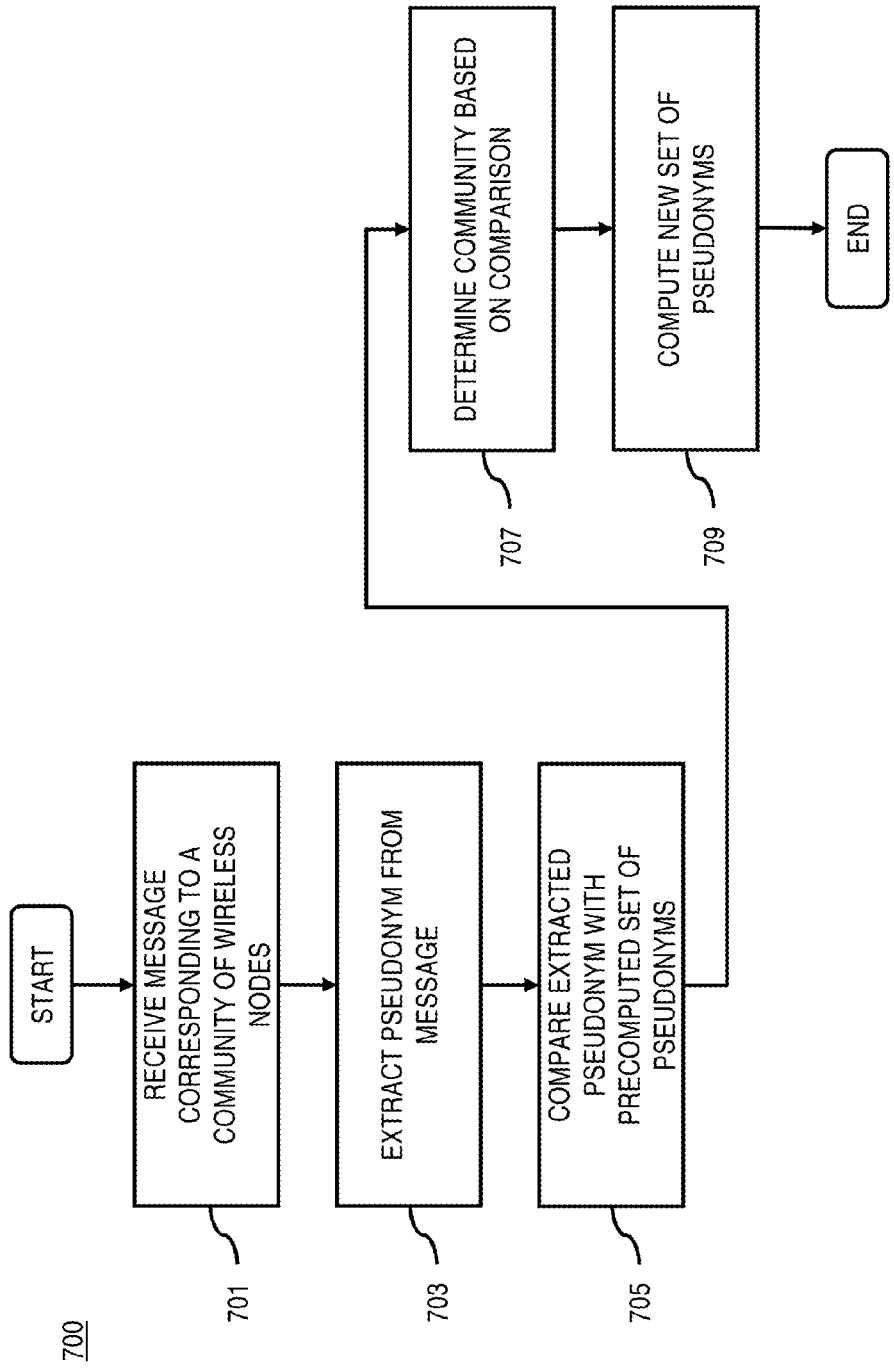
FIG. 7 is a flowchart of a process for receiving a message including a pseudonym, according to an exemplary embodiment.
Figure 12:
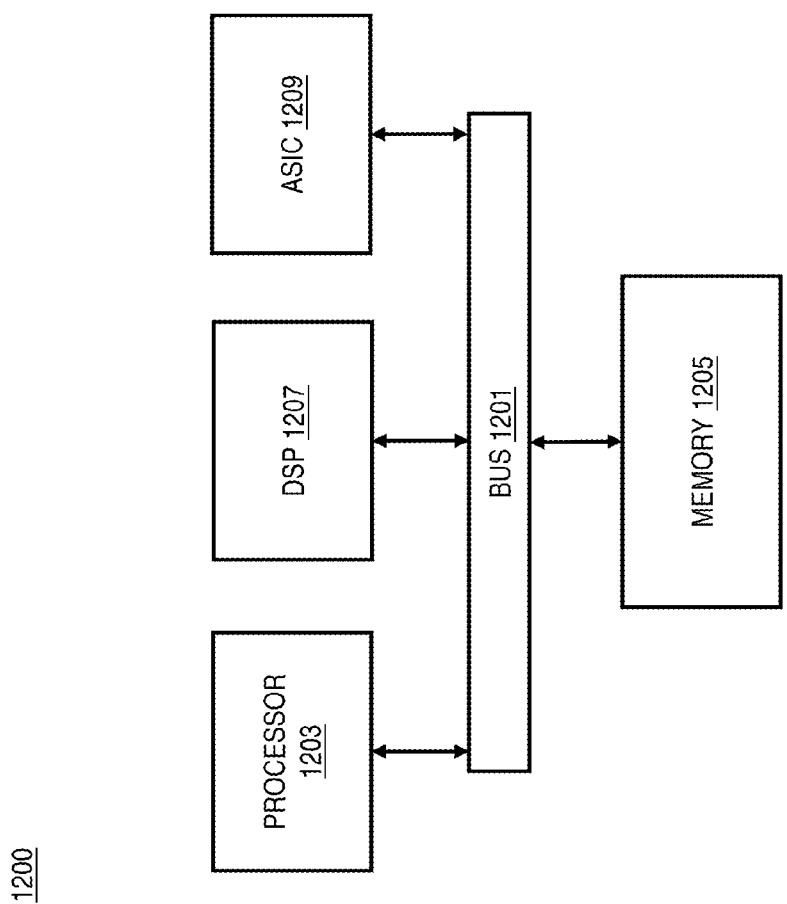
FIG. 12 is a diagram of a chip set that can be used to implement an embodiment of the invention.

FIG. 7 is a flowchart of a process for receiving a message comprising a pseudonym, according to an exemplary embodiment. As previously discussed, the awareness services module 111 uses pseudonyms (e.g., anonymized CIDs) in place of CIDs in messages transmitted among communities within the ad-hoc mesh network 109 to protect the privacy and anonymity of users within the network 109. In one embodiment, the awareness services module 111 performs the process 700 of FIG. 7 and is implemented in, for instance, a chip set comprising a processor and a memory as shown in FIG. 12.

In step 701, the awareness services module 111 receives a message corresponding to one of a plurality of communities of wireless nodes 101. The message, for instance, is received in the format discussed below with respect to FIG. 10A. In exemplary embodiments, the message comprises a pseudonym or index pointing to the pseudonym that corresponds to a particular community of wireless nodes 101 to which the message is addressed. By way of example, the index may be calculated using a hash function based on the pseudonym as described with respect to FIG. 2C above. The awareness services then extracts the pseudonym from the message (step 703). For example, if the pseudonym is included as an index, the step of extracting the pseudonym comprises deriving the index from the message (e.g., from the portion of the message designated to contain the index or pseudonym) and deriving the pseudonym from the index using the corresponding hash function. In certain embodiments, the message may be encrypted or encrypted in part using, for instance, AES or AES-EAX encryption. If the pseudonym is encrypted, the awareness services module 111 decrypts the message to facilitate extraction of the pseudonym.

After extracting the pseudonym from the message, the awareness services module 111 compares the extracted pseudonym with a precomputed set of pseudonyms associated respectively with the communities (step 705). In exemplary embodiments, the set of possible pseudonyms associated with communities to which a particular wireless node 101 belongs is precomputed to reduce resources requirements (e.g., processor and battery resources). Moreover, each of the wireless nodes 101 within the ad-hoc wireless network 109 individually precomputes and stores the set of pseudonyms locally on the corresponding wireless node 101 using, for instance, one or more of the authentication keys associated with the community as described with respect to FIG. 2C. Accordingly, in some embodiments, the awareness services module 111 compares the extracted pseudonym, for instance, with only those precomputed pseudonyms that are associated with the index derived from the message. If, however, resource constraints are not a concern, it is contemplated that the awareness services module 111 can, alternatively or in addition, compute the set of pseudonyms as the message is received. For example, it is noted that a typical wireless node 101 might belong to 200 private communities (i.e., communities that use pseudonyms) and hear 50 messages per second on the average over its radio layer 209. If each message contains a pseudonym, the awareness services module 111 would have to calculate a pseudonym up to ten thousand times per second. Using a precomputed set of pseudonyms enables the awareness services module 111 to avoid having to sustain that rate of calculations.

To provide an even higher level of privacy and anonymity, the precomputed set of pseudonyms is valid only for a particular time period before the pseudonyms expire. Accordingly, the awareness services module 111 ensures that the set of pseudonyms calculated for the same communities are the same for all wireless nodes 101 based on, for instance, a fixed time reference that is common to the wireless nodes 101 (e.g., time since Jan. 1, 2000). In this way, the pseudonyms for the same communities, even when calculated by different wireless nodes 101, remain common to the wireless nodes 101.

Based on the comparison of the extracted pseudonym to the precomputed set of pseudonyms, the awareness services module 111 determines the particular community corresponding to the pseudonym (step 707). In exemplary embodiments, if a wireless node 101 is a member of the community corresponding to the message, the wireless node 101 is able to receive and decrypt (if needed) the message. As the expiration time of the set of precomputed pseudonyms approaches, the awareness service module 111 computes a new set of pseudonyms before the older set expires (step 709).

Figure 8:
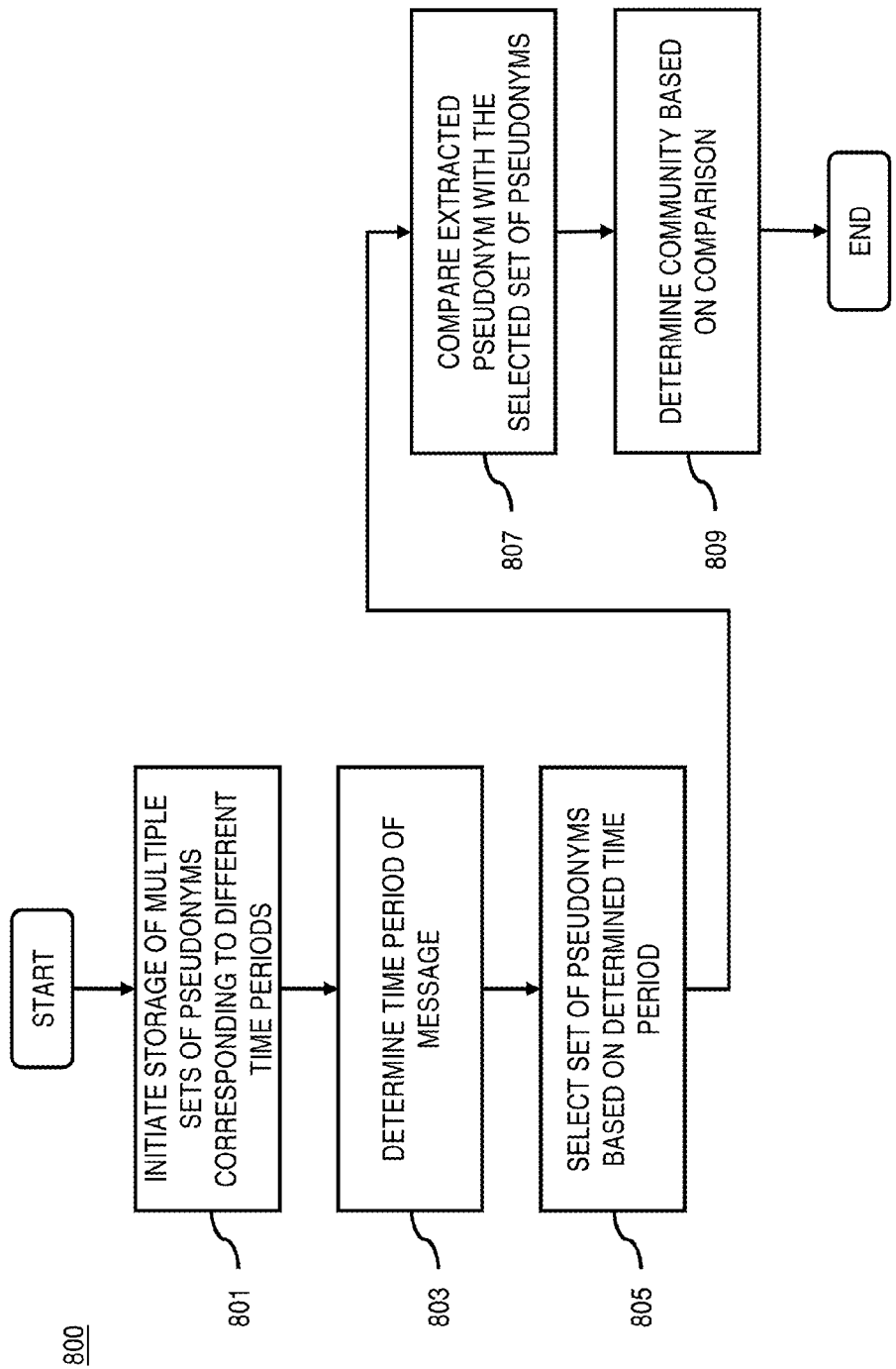
FIG. 8 is a flowchart of a process for extracting a pseudonym using multiple sets of pseudonyms, according to an exemplary embodiment.

FIG. 8 is a flowchart of a process for extracting a pseudonym using multiple sets of pseudonyms, according to an exemplary embodiment. In one embodiment, the awareness services module 111 performs the process 800 and is implemented in, for instance, a chip set comprising a processor and a memory as shown in FIG. 12. As described above with respect to FIG. 7, a new set of pseudonyms is generated for each time period to ensure a higher level of privacy and anonymity. In step 801, the awareness services module 111 initiates storage of multiple sets of pseudonyms corresponding to different time periods. For example, the awareness services module 111 can precompute and store the sets of pseudonyms associated with the current time period, the immediately preceding time period, and the immediately succeeding time period. It is contemplated that the awareness services module 111 can store any number of sets of pseudonyms. In exemplary embodiments, it is noted that messages may be received in a time period other than the time period in which the message was sent (e.g., when delivery is delayed, or the message spans two time periods).

On receipt of a message, the awareness services module 111 determines the time period during which the message was sent (step 803). For example, the awareness services module 111 may check for a time stamp associated with the message or may infer the date from the content of the message. After determining the time period, the awareness services module 111 selects one of the sets of pseudonyms that correspond to the determined time period (step 805). As described with respect to FIG. 7, the awareness services module 111 then compares the extracted pseudonym against the selected set of pseudonyms (step 807) to determine the particular community corresponding to the message (step 809).

FIG. 9 is a flowchart of a process for transmitting a message including a pseudonym, according to an exemplary embodiment. In one embodiment, the awareness services module 111 performs the process 900 and is implemented in, for instance, a chip set comprising a processor and a memory as shown in FIG. 12. In step 901, the awareness services module 111 selects a pseudonym from a precomputed set of pseudonyms corresponding to the current time period. It is assumed that the awareness services module 111 has already precomputed the set of pseudonyms prior to the selection of the set using the process as described with respect to FIG. 2C above. As described with respect to FIG. 7, each wireless node within the community individually precomputes and stores the set of pseudonyms locally based on a common fixed time reference to ensure each wireless node 101 computes the same set of pseudonyms for the same community.

The awareness services module 111 then generates a message comprising the pseudonym corresponding to one of a plurality of communities of wireless nodes 101 to which the message is addressed (step 903). The message may, for instance, include a query for information or a message publishing information over the ad-hoc mesh network 109. In exemplary embodiments, the awareness services module 111 may also encrypt the message using one of the authentication keys associated with the message. The awareness services module 111 then initiates the transmission of the message, for instance, over the ad-hoc mesh network 109 to the other wireless nodes within the network 109 (step 905).

FIG. 10A is a diagram depicting the field structure of a message comprising a pseudonym, according to an exemplary embodiment. As shown, a message 1001 comprises a field structure to support the processes described with respect to FIGS. 7-9. In exemplary embodiments, the message 1001 comprises five fields: (1) "S" field 1003—representing the sending node's network identifier, (2) "j" field 1005—providing a counter of messages during current time period, (3) bit vector field 1007—providing one or more flags associated with the message 1001, (4) "X" field 1009—representing the community pseudonym or index pointing to the pseudonym, and (5) "Y" field 1011—the text of the message. It is noted that in certain embodiments, the one or more of the fields described above may be used in addition to or as alternate embodiments of the data structure of the network layer message header 281 described with respect to FIG. 2F. For example, the S field 1003 is equivalent to the SRC field 293 of FIG. 2F and the j field 1005 is equivalent to the hop count field 296 of FIG. 2F, More specifically, the S field 1003 may be, for instance, the node identification number (NID). It is contemplated that the S field 1003 corresponding to a wireless node 101 may change periodically to increase protection of privacy and anonymity. The j field 1005 provides a count of messages that the wireless node 101 has sent since the beginning of the current time period t. For example, the j field 1005 increments with each message sent to provide a unique number (e.g., a message identification number (MID)) for each message. The X field 1009 represents the pseudonym or index to the pseudonym generated per the processes described with respect to FIGS. 2C and 7-9. The Y field 1011 represents the text of the actual message (e.g., providing information, query, status, etc.). In exemplary embodiments, the Y field 1009 may be encrypted using, for instance, AES-EAX encryption based on an authentication key associated with the community.

The processes described herein for using pseudonyms may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof Such exemplary hardware for performing the described functions is detailed below.

FIG. 10B is a diagram of a digital trie data structure for storing pseudonyms, according to an exemplary embodiment. As discussed previously, a trie is a hierarchy of records (e.g., a hexadecimal digit is stored in a record containing 16 fields. The value of each field is either "empty," or a pointer to the next record, or a pointer to the community data ($C_v, K_v, A_v, B_v$), which is the search result if the device is a member of $C_v$. "Empty" field means that the corresponding value of the digit is not stored; it will abort the search with negative result. As shown in FIG. 10B, a trie 1020 contains four values of $X_j$: 3a7ea0d580, 3a7ea0d5e7, 3a7ea0d58d and a93d487aa9, that lead to the data of communities $C_1$, $C_3$, $C_0$ and $C_2$, respectively. The search of community data given a pseudonym X starts at the root record $b_1$ and follows a single path that contains at most ten records as shown by the arrows in FIG. 10B.

Figure 11:
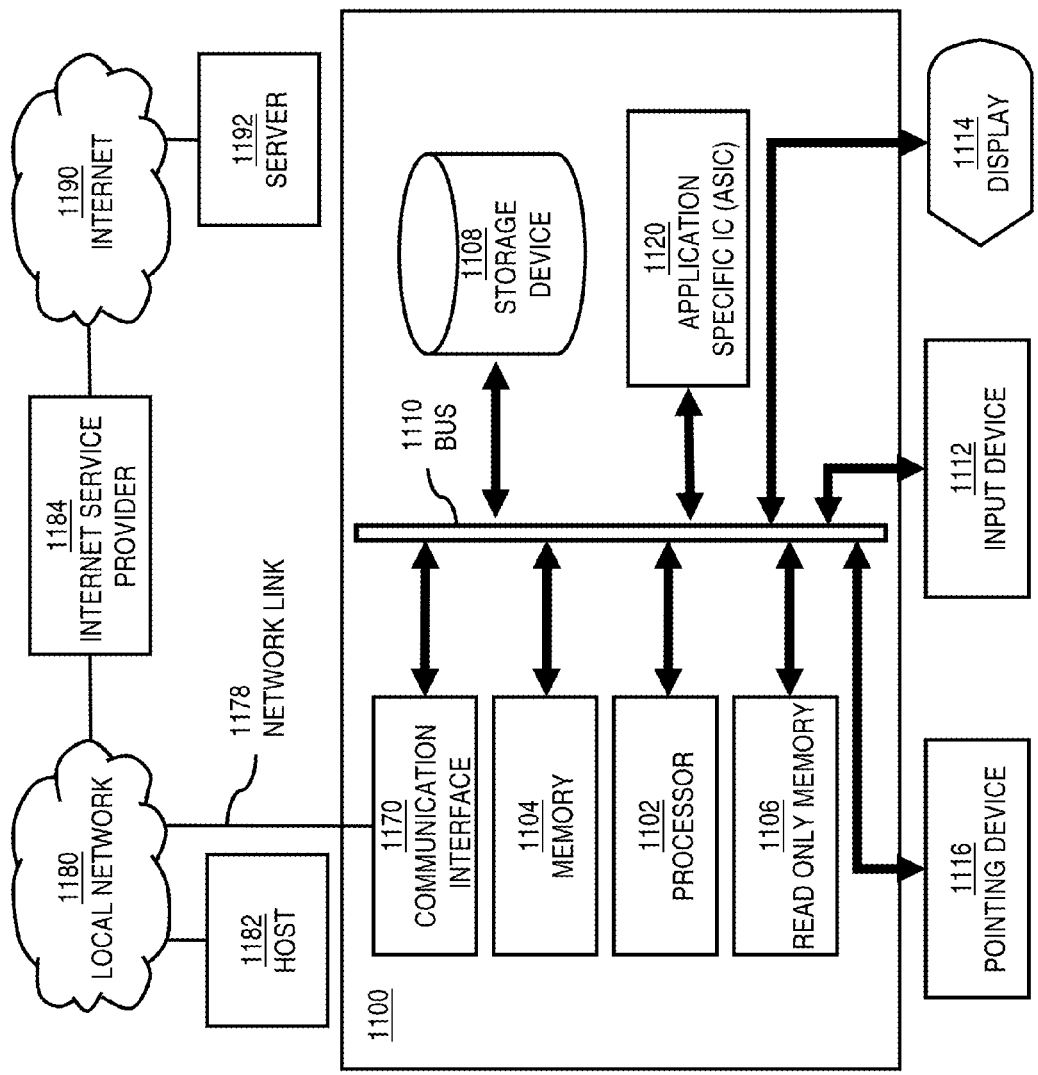
FIG. 11 is a diagram of hardware that can be used to implement an embodiment of the invention.

FIG. 11 illustrates a computer system 1100 upon which an embodiment of the invention may be implemented. Computer system 1100 is programmed to provide a user interface as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information related to using pseudonyms. The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for using pseudonyms. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for using pseudonyms, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In exemplary embodiments, the communications interface 1170 enables connection to the communication network 103 for using pseudonyms.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to provide awareness information over an ad-hoc mesh network 109 as described herein and includes, for instance, the processor and memory components described with respect to FIG. 12 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide awareness information over an ad-hoc mesh network 109. The memory 1205 also stores the data associated with or generated by the execution of the inventive steps.

FIG. 13 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions such as the awareness services module 111. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software facilitate user control of at least come functions of the mobile station 1301. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a message corresponding to one of a plurality of communities of mobile wireless nodes each comprising a wireless transmitter and a wireless receiver for communicating with other wireless nodes within communication range to form an ad-hoc mesh network, where a wireless node is a member of n communities of wireless nodes, where n is an integer greater than 1;

extracting a pseudonym from the message;

comparing the extracted pseudonym with a precomputed set of pseudonyms associated respectively with the communities; and determining an identification of one of the plurality of communities that the received message was addressed to based on the comparison, wherein the precomputed set of pseudonyms is valid for only one predetermined time period.

2. The method of claim 1, wherein the set of pseudonyms is precomputable and storable by each wireless node within the plurality of communities.

3. The method of claim 1, wherein the set of pseudonyms is computed based on a fixed time reference common to the wireless nodes within the plurality of communities.

4. The method of claim 1, further comprising:
computing a new set of pseudonyms before the precomputed set of pseudonyms expires.

5. The method of claim 1, further comprising:
initiating storage of a plurality of sets of pseudonyms corresponding to different time periods;
determining one of the time periods in which the message was sent;
selecting one of the sets of pseudonyms corresponding to the determined time period from among the plurality of stored sets of pseudonyms;
comparing the extracted pseudonym with the selected set of pseudonyms; and
determining the particular one of the communities based on the comparison.

6. The method of claim 1, wherein extracting the pseudonym comprises deriving an index from the message.

7. The method of claim 6, wherein comparing the extracted pseudonym with a precomputed set of pseudonym associated respectively with the communities comprises comparing the extracted pseudonym only with those precomputed pseudonyms that are associated with the index.

8. An apparatus comprising:
at least one processor; and
at least one memory including computer program code,
the at least one memory and the computer program code configured to, with the at least one processor, cause the apparatus to perform at the following,
receive a message corresponding to one of a plurality of communities of wireless nodes where each wireless node comprises a wireless transmitter and a wireless receiver for communicating with other wireless nodes within communication range to form an ad-hoc mesh network, where a wireless node is a member of n communities of wireless nodes, where n is an integer greater than 1,
extract a pseudonym from the message,
compare the extracted pseudonym with a precomputed set of pseudonyms associated respectively with the communities, and
determine an identification of one of the plurality of communities that the received message was addressed to based on the comparison,
wherein the precomputed set of pseudonyms is valid for only one predetermined time period.

9. The apparatus of claim 8, wherein the set of pseudonyms is precomputable and storable by each wireless node within the plurality of communities.

10. The apparatus of claim 8, wherein the set of pseudonyms is computed based on a fixed time reference common to the wireless nodes within the plurality of communities.

11. The apparatus of claim 8, wherein the apparatus is further caused to:
compute a new set of pseudonyms before the precomputed set of pseudonyms expires.

12. The apparatus of claim 8, wherein the apparatuses is further caused to:
initiate storage of a plurality of sets of pseudonyms corresponding to different time periods;
determine one of the time periods in which the message was sent;
select one of the sets of pseudonyms corresponding to the determined time period from among the plurality of stored sets of pseudonyms;
compare the extracted pseudonym with the selected set of pseudonyms; and
determine the particular one of the communities based on the caparison.

13. The apparatus of claim 8, wherein extracting the pseudonym comprises:
deriving an index from the message.

14. The apparatus of claim 13, wherein comparing the extracted pseudonym with a precomputed set of pseudonym associated respectively with the communities comprises comparing the extracted pseudonym only with those precomputed pseudonyms that are associated with the index.

15. The apparatus of claim 8, wherein the apparatus is a mobile phone further comprising:
user interface circuitry and user interface software configure to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

16. The apparatus of claim 15, wherein the mobile phone comprises a radio comprising the wireless transmitter and the wireless receiver for device-to-device communication.

17. A method comprising:
selecting a pseudonym from a precomputed set of pseudonyms;
generating a message comprising the pseudonym or an index pointing to the pseudonym corresponding to one of a plurality of communities of wireless nodes, each wireless node comprising a wireless transmitter and a wireless receiver for communicating with other wireless nodes within communication range to form an ad-hoc mesh network, where a wireless node is a member of n communities of wireless nodes, where n is an integer greater than 1; and
initiating transmission of the message to a plurality of wireless nodes,
wherein the precomputed set of pseudonyms is valid for only one predetermined time period.

18. The method of claim 17, wherein each wireless node within the community individually precomputes and stores the set of pseudonyms locally.

19. The method of claim 17, wherein the set of pseudonyms is computed based on a fixed time reference common to all wireless nodes within the plurality of communities.

20. The method of claim 17, wherein the index is calculated using a hash function based on the pseudonym.

* * * * *

UNITED STATES PATENT AND TRADEMARK OFFICE
CERTIFICATE OF CORRECTION

| | | |
|---|---|---|
| PATENT NO. | : 8,571,519 B2 | Page 1 of 1 |
| APPLICATION NO. | : 12/437432 | |
| DATED | : October 29, 2013 | |
| INVENTOR(S) | : Philip Ginzboorg | |

It is certified that error appears in the above-identified patent and that said Letters Patent is hereby corrected as shown below:

IN THE CLAIMS:

In Claim 12: Column 38, line 8, delete "apparatuses" and replace with --apparatus--;

Column 38, line 20, delete "caparison" and replace with --comparison-- as indicated in the originally filed application.

Signed and Sealed this
Twenty-eighth Day of January, 2014

Michelle K. Lee
*Deputy Director of the United States Patent and Trademark Office*